(12) United States Patent
Takasugi et al.

(10) Patent No.: US 9,273,374 B2
(45) Date of Patent: Mar. 1, 2016

(54) HEAT-RESISTANT BEARING FORMED OF TA OR A1-ADDED $NI_3$(SI, TI)-BASED INTERMETALLIC COMPOUND ALLOY AND METHOD FOR PRODUCING THE SAME

(75) Inventors: Takayuki Takasugi, Sakai (JP); Yasuyuki Kaneno, Sakai (JP); Hidekazu Fujii, Sakai (JP)

(73) Assignee: OSAKA PREFECTURE UNIVERSITY PUBLIC CORPORATION, Sakai-Shi (JP)

( * ) Notice: Subject to any disclaimer, the term of this patent is extended or adjusted under 35 U.S.C. 154(b) by 140 days.

(21) Appl. No.: 13/981,958

(22) PCT Filed: Jan. 27, 2012

(86) PCT No.: PCT/JP2012/051845
§ 371 (c)(1),
(2), (4) Date: Jul. 26, 2013

(87) PCT Pub. No.: WO2012/102386
PCT Pub. Date: Aug. 2, 2012

(65) Prior Publication Data
US 2013/0308884 A1    Nov. 21, 2013

(30) Foreign Application Priority Data
Jan. 27, 2011    (JP) .................................. 2011-015380

(51) Int. Cl.
*F16C 33/00*       (2006.01)
*C22C 19/03*       (2006.01)
(Continued)

(52) U.S. Cl.
CPC . *C21D 9/40* (2013.01); *C22C 19/03* (2013.01); *F16C 33/303* (2013.01); *F16C 33/32* (2013.01); *F16C 33/414* (2013.01); *F16C 33/44* (2013.01); *F16C 33/62* (2013.01)

(58) Field of Classification Search
USPC ........................................... 428/680; 420/441
See application file for complete search history.

(56) References Cited

U.S. PATENT DOCUMENTS

| | | | |
|---|---|---|---|
| 2011/0152138 A1* | 6/2011 | Nakai et al. | 508/103 |
| 2012/0171071 A1* | 7/2012 | Kaneno et al. | 420/441 |

FOREIGN PATENT DOCUMENTS

| | | | | |
|---|---|---|---|---|
| JP | 4-268037 A | 9/1992 | | |
| JP | H04-268037 | * 9/1992 | ............. | C22C 19/03 |
| JP | 5-320793 A | 12/1993 | | |
| JP | 8-60278 A | 3/1996 | | |
| JP | 2002-221227 A | 8/2002 | | |
| JP | 2010-31323 A | 2/2010 | | |

(Continued)

*Primary Examiner* — Humera Sheikh
*Assistant Examiner* — Lucas Wang
(74) *Attorney, Agent, or Firm* — Birch, Stewart, Kolasch & Birch, LLP

(57) ABSTRACT

The present invention provides a heat-resistant bearing characterized in that it is formed of an $Ni_3$(Si,Ti)-based intermetallic compound alloy, the $Ni_3$(Si,Ti)-based intermetallic compound alloy containing 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities, the $Ni_3$(Si,Ti)-based intermetallic compound alloy having a microstructure composed of an $L1_2$ phase and of one or both of an Ni solid solution phase and a second phase dispersion containing Ni and Ta, or a microstructure composed of an $L1_2$ phase.

19 Claims, 24 Drawing Sheets
(20 of 24 Drawing Sheet(s) Filed in Color)

(51) Int. Cl.
*B32B 15/00* (2006.01)
*C21D 9/40* (2006.01)
*F16C 33/30* (2006.01)
*F16C 33/32* (2006.01)
*F16C 33/41* (2006.01)
*F16C 33/44* (2006.01)
*F16C 33/62* (2006.01)

(56) References Cited

FOREIGN PATENT DOCUMENTS

| WO | WO2010/134602 | * 11/2010 | ............. F16C 33/32 |
| WO | WO2011/030905 | * 3/2011 | ............. C22C 19/03 |
| WO | WO 2011/030905 A1 | 3/2011 | |

* cited by examiner (1)

(2)

(1)

(2)

(1)

(2)

(1)

(2)

(1)

(2)

HEAT-RESISTANT BEARING FORMED OF TA OR AL-ADDED NI₃(SI, TI)-BASED INTERMETALLIC COMPOUND ALLOY AND METHOD FOR PRODUCING THE SAME

TECHNICAL FIELD

The present invention relates to a heat-resistant bearing formed of a Ta or Al-added $Ni_3(Si,Ti)$-based intermetallic compound alloy and to a method for producing the same.

BACKGROUND ART

A bearing is a machine element that is used in many machines and apparatuses ranging from daily goods to industrial products and is used in a broad range of environments from room temperature to high temperature. For example, the bearing is used under high-temperature environments in the field of manufacturing including semiconductors and liquid crystal panels and in the field of sophisticated industry including thermal treatment equipment.

However, the limit of its practical working temperature is approximately 300° C. because of material constraints. For example, a bearing formed of martensite stainless steel, heat resisting steel for bearings or the like is abruptly reduced in hardness with rise of the working temperature, and therefore the limit of the working temperature is approximately 300 to 400° C. considering practical life. Accordingly, when a bearing is used under a high-temperature environment, a cooling device for cooling the bearing is provided or the bearing is isolated from a high-temperature environment (for example, inside of a furnace).

From such a background, development of a heat-resistant bearing usable under high-temperature environments has been desired. As a bearing that can have a long life even under a high-temperature and special environment, for example, there has been known a bearing in which a base material of rolling elements is bearing steel or stainless steel and surfaces of the rolling elements are nitrided (see Patent Document 1, for example).

RELATED ART DOCUMENTS

Patent Document

[Patent Document 1] Japanese Unexamined Patent Publication No. 2002-221227

SUMMARY OF THE INVENTION

Problems to be Solved by the Invention

However, in the field of manufacturing including semiconductors and liquid crystal panels and in industrial facilities for heat treatment, a bearing further stable to operate at high temperature has been demanded. For example, a heat-resistant bearing has been demanded which is usable without cooling at a temperature at which a conventional bearing cannot be used without cooling.

In view of the above-described circumstances, the present invention has been achieved to provide a bearing that can operate steadily at high temperature.

Means for Solving the Problems

The present invention provides a heat-resistant bearing characterized in that it is formed of an $Ni_3(Si,Ti)$-based intermetallic compound alloy, the $Ni_3(Si,Ti)$-based intermetallic compound alloy containing 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities, the $Ni_3(Si,Ti)$-based intermetallic compound alloy having a microstructure composed of an $L1_2$ phase and of one or both of an Ni solid solution phase and a second phase dispersion containing Ni and Ta, or a microstructure composed of an $L1_2$ phase.

The present invention also provides a heat-resistant bearing characterized in that it is formed of an $Ni_3(Si,Ti)$-based intermetallic compound alloy, the $Ni_3(Si,Ti)$-based intermetallic compound alloy containing 25 to 500 ppm by weight of B with respect to a weight of an intermetallic compound having a composition of 100% by atom in total consisting of 10.0 to 12.0% by atom of Si, 1.0 to 9.0% by atom of Ti, 0.5 to 8.5% by atom of Al and a balance made up of Ni excepting impurities, the $Ni_3(Si,Ti)$-based intermetallic compound alloy having a microstructure composed of an $L1_2$ phase or a microstructure composed of an Ni solid solution phase and an $L1_2$ phase.

Effects of the Invention

Since heat-resistant bearings are used under high-temperature and special environments, materials thereof are required to have special properties such as high-temperature strength, high-temperature wear resistance, oxidation resistance and corrosion resistance. The inventors of the present invention focused on $Ni_3(Si,Ti)$-based intermetallic compound alloys, which have excellent high-temperature strength, as the materials of the heat-resistant bearings. Considering that the oxidation resistance of the $Ni_3(Si,Ti)$-based intermetallic compound alloys is reduced by addition of Ti, the inventors then originated addition of Ta or Al instead of Ti and made intensive studies. As a result, the inventors have found that when a bearing is formed of an $Ni_3(Si,Ti)$-based intermetallic compound alloy containing Ta or Al in addition to Ni, Si, Ti and B, the bearing operates steadily at high temperature to complete the present invention.

In addition, an experiment carried out by the inventors of the present invention has revealed that an $Ni_3(Si,Ti)$-based intermetallic compound alloy will have improved oxidation resistance when Ta or Al is added thereto.

Furthermore, since Ta and Al are characterized in that the amount thereof that dissolves in an $L1_2$ phase (dissolution amount) is larger than those of other elements, the $Ni_3(Si,Ti)$-based intermetallic compound alloy containing Ta and the $Ni_3(Si,Ti)$-based intermetallic compound alloy containing Al will be able to maintain the $L1_2$ phase even when the addition amount of Ta or Al is increased and have a microstructure free from hard second phase particles, which are harder than an Ni solid solution phase and the $L1_2$ phase. It is therefore expected that heat-resistant bearings formed of these $Ni_3(Si,Ti)$-based intermetallic compound alloys operate steadily at high temperature. The Ni solid solution phase and the $L1_2$ phase do not have a so large difference in hardness. However, when a metal element added cannot dissolve in the Ni solid solution phase and in the $L1_2$ phase, it may be precipitated as hard second phase particles. When the hard second phase particles are included in the intermetallic compound alloy to serve as a material of a heat-resistant bearing, stress concentration may occur in the hard second phase particles during the use of the bearing to cause peel-off and a crack, leading to a shortened bearing life.

The present invention provides a heat-resistant bearing that operates steadily at high temperature.

BRIEF DESCRIPTION OF THE DRAWINGS

The patent or application file contains at least one color drawing. Copies of this patent or patent application publication with color drawing will be provided by the USPTO upon request and payment of the necessary fee.

In FIG. 27, the temperature of the heat treatment is 600° C. (1) represents the alloy of Example 1 ($Ni_3(Si,Ti)$-based intermetallic compound alloy to which 3 at. % of Ta was added), (2) represents NST (basic composition material of the $Ni_3(Si,Ti)$-based intermetallic compound alloy), and (3) represents the alloy of Comparative Example (SUS440C).

MODE FOR CARRYING OUT THE INVENTION

Embodiment 1

Figure 1:
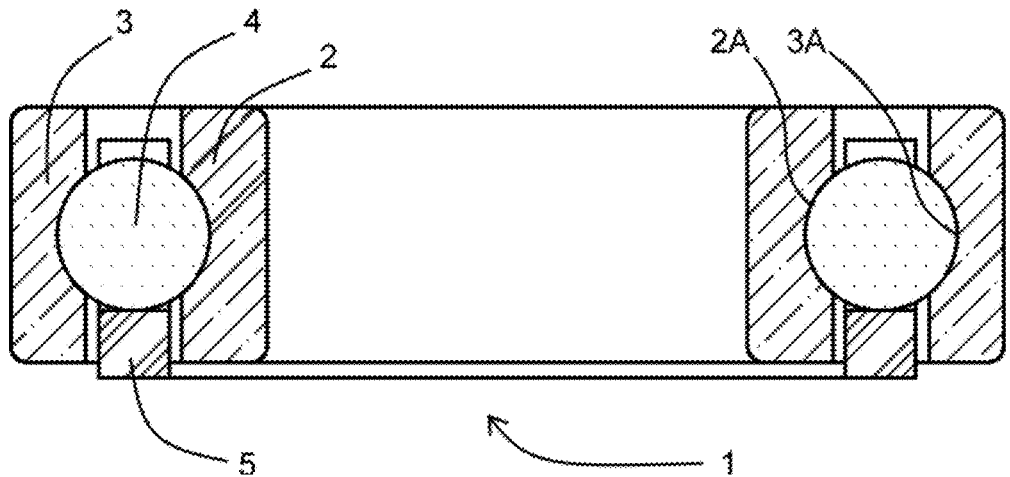
FIG. 1 is a sectional view of a bearing according to Embodiments 1 and 2 of the present invention.

According to an aspect, a heat-resistant bearing of the present invention is characterized in that it is formed of an $Ni_3(Si,Ti)$-based intermetallic compound alloy, the $Ni_3(Si,Ti)$-based intermetallic compound alloy containing 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities, the $Ni_3(Si,Ti)$-based intermetallic compound alloy having a microstructure composed of an $L1_2$ phase and of one or both of an Ni solid solution phase and a second phase dispersion containing Ni and Ta, or a microstructure composed of an $L1_2$ phase.

According to the present invention, a bearing that operates steadily at high temperature is provided. Hereinafter, the bearing according to the present invention will be referred to as "bearing formed of a Ta-added $Ni_3(Si,Ti)$-based intermetallic compound alloy".

In this specification, in addition, an intermetallic compound alloy based on a composition of $Ni_3(Si,Ti)$ will be referred to as "$Ni_3(Si,Ti)$-based intermetallic compound alloy".

In an embodiment of the bearing formed of a Ta-added $Ni_3(Si,Ti)$-based intermetallic compound alloy, the $Ni_3(Si,Ti)$-based intermetallic compound alloy may contain 25 to 500 ppm by weight of B with respect to a weight of an intermetallic compound having a composition of 100% by atom in total consisting of 10.0 to 12.0% by atom of Si, 4.5 to 6.5% by atom of Ti, 3.5 to 5.0% by atom of Ta and a balance made up of Ni excepting impurities, and have a microstructure composed of an Ni solid solution phase and an $L1_2$ phase or a microstructure composed of an $L1_2$ phase. In another embodiment, the $Ni_3(Si,Ti)$-based intermetallic compound alloy may have a single-phase microstructure composed of an $L1_2$ phase. In still another embodiment, the $Ni_3(Si,Ti)$-based intermetallic compound alloy may contain 25 to 500 ppm by weight of B with respect to a weight of an intermetallic compound having a composition of 100% by atom in total consisting of 19.0 to 21.5% by atom in total of Si, Ti and Ta, and a balance made up of Ni excepting impurities.

Hereinafter, the content of each component will be described in detail. In this specification, "A to B" means that numerical values A and B are included in the range, unless otherwise stated.

The Ni content is, for example, 78.5 to 81.0% by atom, and preferably 78.5 to 80.5% by atom. Specific examples of the Ni content include 78.5, 79.0, 79.5, 80.0, 80.5 and 81.0% by atom. The range of the Ni content may be between any two of the numeral values exemplified here.

The Si content is 7.5 to 12.5% by atom, and preferably 10.0 to 12.0% by atom. Specific examples of the Si content include 7.5, 8.0, 8.5, 9.0, 9.5, 10.0, 10.5, 11.0, 11.5, 12.0 and 12.5% by atom. The range of the Si content may be between any two of the numeral values exemplified here.

The Ti content is 1.5% by atom or more but less than 7.5% by atom, and preferably 4.5 to 6.5% by atom. Specific examples of the Ti content include 1.5, 2.0, 2.5, 3.0, 3.5, 4.0, 4.5, 5.0, 5.5, 6.0, 6.5, 7.0 and 7.5% by atom. The range of the Ti content may be between any two of the numeral values exemplified here.

The Ta content is more than 2.0% by atom but 8.0% by atom or less, and preferably 3.0 to 5.0% by atom. Specific examples of the Ta content include 2.0, 2.5, 3.0, 3.5, 4.0, 4.5, 5.0, 5.5, 6.0, 6.5, 7.0, 7.5 and 8.0% by atom. The range of the Ta content may be between any two of the numeral values exemplified here.

In addition, the total of the Ti and Ta contents may be 9.0 to 11.5% by atom. For example, the total of the Ti and Ta contents is 9.0, 9.5, 10.0, 10.5, 11.0 or 11.5% by atom. The range of the total of the Ti and Ta contents may be between any two of the numeral values exemplified here.

In addition, the total of the Si, Ti and Ta contents is 19.0 to 21.5% by atom, and preferably 19.5 to 21.5% by atom.

The content of each element is adjusted as appropriate so that the total of the Ni, Si, Ti and Ta contents is 100% by atom.

The B content is 25 to 500 ppm by weight, and preferably 25 to 100 ppm by weight. Specific examples of the B content include 25, 40, 50, 60, 75, 100, 150, 200, 300, 400 and 500 ppm by weight. The range of the B content may be between any two of the numeral values exemplified here.

The $Ni_3(Si,Ti)$-based intermetallic compound alloy to serve as the material of a bearing may substantially consist of the elements Ni, Si, Ti, B and Ta or may contain an impurity element other than these elements. For example, the $Ni_3(Si,Ti)$-based intermetallic compound alloy may substantially consist only of the elements Ni, Si, Ti, B and Ta, containing an inevitable impurity as the impurity element.

The $Ni_3(Si,Ti)$-based intermetallic compound alloy formed from the above-described materials has a Vickers' hardness of, for example, 430 to 510, and preferably 450 to 490 at room temperature. Specific examples thereof include 430, 440, 450, 460, 470, 480 and 490. The Vickers' hardness at room temperature may be in a range between any two of the numeral values exemplified here.

The Vickers' hardness at 500° C. may be 440 to 490.

The $Ni_3(Si,Ti)$-based intermetallic compound alloy as the material of a bearing has a microstructure composed of an $L1_2$ phase and of one or both of an Ni solid solution phase and a second phase dispersion containing Ni and Ta, or a microstructure composed of an $L1_2$ phase.

Here, the microstructure composed of an $L1_2$ phase and of one or both of an Ni solid solution phase and a second phase dispersion containing Ni and Ta, or the microstructure composed of an $L1_2$ phase is any one of the following microstructures: (1) a microstructure composed of a second phase dispersion containing Ni and Ta, an Ni solid solution phase, and an $L1_2$ phase; (2) a microstructure composed of a second phase dispersion containing Ni and Ta, and an $L1_2$ phase; (3) a microstructure composed of an Ni solid solution phase and an $L1_2$ phase; and (4) a microstructure composed of an $L1_2$ phase. The second phase dispersion containing Ni and Ta is an $Ni_3Ta$, for example.

Preferably, the $Ni_3(Si,Ti)$-based intermetallic compound alloy has a single-phase microstructure composed of an $L1_2$ phase or a microstructure composed of an $L1_2$ phase and an Ni solid solution phase. This is because when particles of a hard second phase such as $Ni_3Ta$ disperse, they are likely to be a starting point of peel-off and introduction of a crack, and therefore it is preferable for the formation of the bearing that the microstructure is composed of a phase having a similar hardness to the matrix such as an $L1_2$ single phase and an Ni solid solution phase. The $L1_2$ phase is an $Ni_3(Si,Ti)$ phase in which Ta dissolves, and the Ni solid solution phase has an fcc structure.

More preferably, the $Ni_3(Si,Ti)$-based intermetallic compound alloy has a single-phase microstructure composed of an $L1_2$ phase. This is because the wear resistance is improved with increase in hardness, and such a microstructure improves the hardness. The single-phase microstructure composed of an $L1_2$ phase is preferable also in terms of the life, which is affected by deformation or accuracy of dimension of the bearing.

In order to improve the manufacturability and the workability (for example, thread rolling) of the bearing, the bearing may be formed of an $Ni_3(Si,Ti)$-based intermetallic compound alloy having a microstructure composed of an $L1_2$ phase and an Ni solid solution phase.

In addition, dissolving in the $L1_2$ phase in a large amount, Ta particularly has a significant solid solution hardening on the $Ni_3(Si,Ti)$-based intermetallic compound alloy. It is therefore expected that a bearing formed of the Ta-added $Ni_3(Si,Ti)$-based intermetallic compound alloy has excellent wear resistance.

Embodiment 2

According to another aspect, a heat-resistant bearing of the present invention is characterized in that it is formed of an $Ni_3(Si,Ti)$-based intermetallic compound alloy, the $Ni_3(Si,Ti)$-based intermetallic compound alloy containing 25 to 500 ppm by weight of B with respect to a weight of an intermetallic compound having a composition of 100% by atom in total consisting of 10.0 to 12.0% by atom of Si, 1.0 to 9.0% by atom of Ti, 0.5 to 8.5% by atom of Al and a balance made up of Ni excepting impurities, the $Ni_3(Si,Ti)$-based intermetallic compound alloy having a microstructure composed of an $L1_2$ phase or a microstructure composed of an Ni solid solution phase and an $L1_2$ phase.

According to the present invention, a bearing that operates steadily at high temperature is provided. Hereinafter, the bearing according to the present invention will be referred to as "bearing formed of an Al-added $Ni_3(Si,Ti)$-based intermetallic compound alloy".

Alternatively, the heat-resistant bearing may be formed of an $Ni_3(Si,Ti)$-based intermetallic compound alloy, the $Ni_3(Si,Ti)$-based intermetallic compound alloy containing 25 to 500 ppm by weight of B with respect to a weight of an intermetallic compound having a composition of 100% by atom in total consisting of 10.0 to 12.0% by atom of Si, 1.0 to 9.0% by atom of Ti, 0.5 to 8.5% by atom of Al and a balance made up of Ni excepting impurities, the $Ni_3(Si,Ti)$-based intermetallic compound alloy having a microstructure composed of an $L1_2$ phase.

In an embodiment of the bearing formed of an Al-added $Ni_3(Si,Ti)$-based intermetallic compound alloy, the $Ni_3(Si,Ti)$-based intermetallic compound alloy may contain 25 to 500 ppm by weight of B with respect to a weight of an intermetallic compound having a composition of 100% by atom in total consisting of 10.0 to 12.0% by atom of Si, 6.5 to 8.5% by atom of Ti, 1.0 to 3.0% by atom of Al and a balance made up of Ni excepting impurities, and have a microstructure composed of an $L1_2$ phase. In another embodiment, the $Ni_3(Si,Ti)$-based intermetallic compound alloy may contain 25 to 500 ppm by weight of B with respect to a weight of an intermetallic compound having a composition of 100% by atom in total consisting of 19.0 to 21.5% by atom in total of Si, Ti and Al, and a balance made up of Ni excepting impurities.

Hereinafter, the content of each component of the Al-added $Ni_3(Si,Ti)$-based intermetallic compound alloy will be described in detail as in the case of Embodiment 1.

The Ni content is, for example, 78.5 to 81.0% by atom, and preferably 78.5 to 80.5% by atom. Specific examples of the Ni content include 78.5, 79.0, 79.5, 80.0, 80.5 and 81.0% by atom. The range of the Ni content may be between any two of the numeral values exemplified here.

The Si content is 7.5 to 12.5% by atom, and preferably 10.0 to 12.0% by atom. Specific examples of the Si content include 7.5, 8.0, 8.5, 9.0, 9.5, 10.0, 10.5, 11.0, 11.5, 12.0 and 12.5% by atom. The range of the Si content may be between any two of the numeral values exemplified here.

The Ti content is 1.0 to 9.0% by atom, and preferably 6.5 to 8.5% by atom. Specific examples of the Ti content include 1.0, 1.5, 2.0, 2.5, 3.0, 3.5, 4.0, 4.5, 5.0, 5.5, 6.0, 6.5, 7.0, 7.5, 8.0, 8.5 and 9.0% by atom. The range of the Ti content may be between any two of the numeral values exemplified here.

The Al content is 0.5 to 8.5% by atom, and preferably 1.0 to 3.0% by atom. Specific examples of the Al content include 0.5, 1.0, 1.5, 2.0, 2.5, 3.0, 3.5, 4.0, 4.5, 5.0, 5.5, 6.0, 6.5, 7.0, 7.5, 8.0 and 8.5% by atom. The range of the Al content may be between any two of the numeral values exemplified here.

In addition, the total of the Ti and Al contents may be 9.0 to 11.5% by atom. For example, the total of the Ti and Al contents is 9.0, 9.5, 10.0, 10.5, 11.0 or 11.5% by atom. The range of the total of the Ti and Al contents may be between any two of the numeral values exemplified here.

In addition, the total of the Si, Ti and Al contents is 19.0 to 21.5% by atom, and more preferably 19.5 to 21.5% by atom.

The content of each element is adjusted as appropriate so that the total of the Ni, Si, Ti and Al contents is 100% by atom.

The B content is 25 to 500 ppm by weight, and preferably 25 to 100 ppm by weight. Specific examples of the B content include 25, 40, 50, 60, 75, 100, 150, 200, 300, 400 and 500 ppm by weight. The range of the B content may be between any two of the numeral values exemplified here.

The $Ni_3(Si,Ti)$-based intermetallic compound alloy to serve as the material of a bearing may substantially consist of the elements Ni, Si, Ti, B and Al or may contain an impurity element other than these elements. For example, the $Ni_3(Si,Ti)$-based intermetallic compound alloy may substantially consist only of the elements Ni, Si, Ti, B and Al, containing an inevitable impurity as the impurity element.

The above-described Al-added $Ni_3(Si,Ti)$-based intermetallic compound alloy has a Vickers' hardness of, for example, 370 to 440 at room temperature. The Vickers' hardness at 500 to 600° C. is 360 to 400, for example.

The Al-added $Ni_3(Si,Ti)$-based intermetallic compound alloy has a microstructure composed of an $L1_2$ phase or a microstructure composed of an Ni solid solution phase and an $L1_2$ phase. Preferably, the alloy has a single-phase microstructure composed of an $L1_2$ phase. With such a microstructure, the strength properties as high as that of the $Ni_3(Si,Ti)$-based intermetallic compound alloy as a basic composition containing no Al is maintained and the ductility thereof is improved. In addition, the oxidation resistance is also significantly improved. The single-phase microstructure composed of an $L1_2$ phase is preferable also in terms of the life, which is affected by deformation or accuracy of dimension of the bearing.

The Al-added $Ni_3(Si,Ti)$-based intermetallic compound alloy provides excellent manufacturability and workability (for example, thread rolling) to the bearing even when it has a single-phase structure composed of an $L1_2$ phase. In order to further improve the manufacturability and the workability, however, the bearing may be formed of an $Ni_3(Si,Ti)$-based intermetallic compound alloy having a microstructure composed of an $L1_2$ phase and an Ni solid solution phase.

In addition, since Al is characterized in that it has excellent lightweight properties and the raw material thereof is less costly, a heat-resistant bearing formed of the Al-added $Ni_3(Si,Ti)$-based intermetallic compound alloy is advantageous in terms of weight saving and cost reduction. Furthermore, since the Al-added $Ni_3(Si,Ti)$-based intermetallic compound alloy is characterized in that it can be subjected to plastic working, the production cost of the heat-resistant bearing can be reduced.

(Configuration of Bearing)

The bearings described in Embodiments 1 and 2 (bearing formed of a Ta or Al-added $Ni_3(Si,Ti)$-based intermetallic compound alloy) may be a rolling bearing or a slide bearing. The bearings are not particularly limited as long as they are a rolling bearing or a slide bearing, and they may be a ball bearing, a roller bearing, a journal bearing, a radial bearing or a thrust bearing, for example.

In the case of the rolling bearing, for example, a bearing according to another embodiment includes an inner ring, an outer ring and rolling elements that roll between the inner ring and the outer ring, wherein the rolling elements are formed of a ceramic material, and at least one (that is, one or both) of the inner ring and the outer ring is formed of the above-described Ta or Al-added $Ni_3(Si,Ti)$-based intermetallic compound alloy.

Having the inner ring, the outer ring and the rolling elements formed of materials capable of maintaining the hardness at high temperature, such a rolling bearing has a structure resistant to wear as in the case of the bearings having the above-mentioned structure, and as a result, can operate steadily at high temperature.

The heat-resistant bearing includes the inner ring, the outer ring and the rolling elements that roll between the inner ring and the outer ring, wherein the rolling elements may be formed of a ceramic material, and at least one of the inner ring and the outer ring may be formed of an $Ni_3(Si,Ti)$-based intermetallic compound alloy, the $Ni_3(Si,Ti)$-based intermetallic compound alloy containing 25 to 500 ppm by weight of B with respect to a weight of an intermetallic compound having a composition of 100% by atom in total consisting of 10.0 to 12.0% by atom of Si, 1.0 to 9.0% by atom of Ti, 0.5 to 8.5% by atom of Al and a balance made up of Ni excepting impurities, the $Ni_3(Si,Ti)$-based intermetallic compound alloy having a microstructure composed of an $L1_2$ phase or a microstructure composed of an Ni solid solution phase and an $L1_2$ phase.

Alternatively, the rolling elements may be formed of silicon nitride.

FIG. 1 illustrates a specific example. FIG. 1 is a sectional view of a rolling bearing (ball bearing) in which both an inner ring and an outer ring are formed of the above-described Ta or Al-added $Ni_3(Si,Ti)$-based intermetallic compound alloy. A rolling bearing 1 illustrated in FIG. 1 includes: an inner ring 2 having an internal circumferential surface and an external circumferential surface; an outer ring 3 having an internal circumferential surface and an external circumferential surface, the internal circumferential surface of the outer ring 3 facing the external circumferential surface of the inner ring 2; rolling elements 4 rolling between the external circumferential surface of the inner ring 2 and the internal circumferential surface of the outer ring 3; and a cage 5 for holding the rolling elements 4 in such a manner that the rolling elements 4 can roll. The external circumferential surface of the inner ring 2 and the internal circumferential surface of the outer ring 3 are provided with raceway surfaces 2A and 3A, respectively, along which the rolling elements roll. The inner ring 2 and the outer ring 3 are disposed with a predetermined bearing internal space therebetween for allowing the rolling elements 4 to roll along the raceway surfaces 2A and 3A.

In the rolling bearing 1, the inner ring 2 and the outer ring 3 are formed of the above-described Ta or Al-added $Ni_3(Si,Ti)$-based intermetallic compound alloy, and the rolling elements 4 are formed of a ceramic material. Since any materials that allow the raceway surfaces to maintain their hardness at high temperature may be used, the raceway surfaces 2A and 3A of the inner ring 2 and the outer ring 3 may be formed of the above-described Ta or Al-added $Ni_3(Si,Ti)$-based intermetallic compound alloy, and the portions other than the raceway surfaces may be formed of other alloys, for example. Furthermore, either the inner ring 2 or the outer ring 3, or either the raceway surface 2A or the raceway surface 3A may be formed of the above-described Ta or Al-added Ni-based intermetallic compound alloy.

Preferably, the cage 5 is formed of a material having a lubricating function. Preferable examples of the material include graphite, soft metals, ceramic and complexes thereof.

In the case of the slide bearing, as another example, the bearing according to the present embodiment has a shaft-bearing portion (for example, sliding surface) formed of the above-described Ta or Al-added $Ni_3(Si,Ti)$-based intermetallic compound alloy. Since such an $Ni_3(Si,Ti)$-based intermetallic compound alloy maintains its hardness even at high temperature, the bearing has a structure in which the shaft-bearing portion is resistant to wear, and as a result, the slide bearing having such a structure can operate steadily at high temperature.

Figure 2:
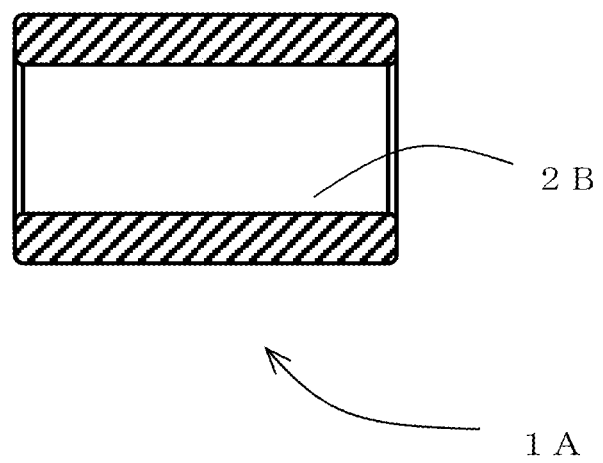
FIG. 2 is a sectional view of a modification of Embodiments 1 and 2 of the present invention.

FIG. 2 illustrates an example of a slide bearing as a modification of the bearing according to the present embodiment. FIG. 2 is a sectional view of the slide bearing. A slide bearing 1A illustrated in FIG. 2 is a so-called single-layer (solid-type) journal bearing. The bearing is formed into a cylindrical shape, and a sliding surface 2B is formed in an internal circumferential surface of the bearing. In the case of this slide bearing, the entire bearing including the sliding surface 2B is formed of the above-described Ta or Al-added Ni-based intermetallic compound alloy. The bearing may be formed entirely of the above-described Ta or Al-added Ni-based intermetallic compound alloy. Alternatively, the slide bearing has a so-called double-layer (bimetal-type) structure including an alloy layer formed of the above-described Ta or Al-added Ni-based intermetallic compound alloy constituting the internal circumferential surface and a back metal layer formed of steel on an external circumferential surface side.

As described above, the raceway components such as the inner ring and the outer ring are preferably formed of the Ni-based intermetallic compound alloy, and the rolling elements are preferably formed of a ceramic material. Here, the raceway components refer to bearing rings having raceway surfaces or raceway grooves. In the case of the rolling bearing, for example, the raceway components refer to the inner ring and the outer ring, and in the case of the thrust bearing, the raceway components refer to washers.

Since rolling elements having a smaller linear expansion coefficient and being less prone to adhesion and damage are preferable, ceramic materials are preferable as the material of the rolling elements. Specifically, silicon nitride is preferable, for example. Other examples of the material include silicon carbide, alumina (aluminum oxide) and zirconia (zirconium oxide). As described above, it is possible to provide a bearing that can operate steadily at high temperature when the rolling elements are formed of a ceramic material.

(Heat-Resistant Properties of Bearing)

The bearings described in Embodiments 1 and 2 (bearing formed of the Ta or Al-added $Ni_3(Si,Ti)$-based intermetallic compound alloy) have excellent heat-resistant properties. That is, they can be used as heat-resistant bearings. Here, the heat-resistant bearings refer to bearings that are used at a temperature of 500° C. to 600° C., for example. Considering the Vickers' hardness value at high temperature of the ingot to be described later, the bearings may be used at 300° C. to 800° C. Examples of the temperature include 300° C., 350° C., 400° C., 450° C., 500° C., 550° C., 600° C., 650° C., 700° C., 750° C. and 800° C. The temperature may be in a range between any two of the numeral values exemplified here.

(Method for Producing Bearing)

First, an ingot of the above-described Ta or Al-added $Ni_3(Si,Ti)$-based intermetallic compound alloy is prepared. For example, raw metals of the elements are prepared according to the composition of each embodiment, and then melted in a melting furnace and poured into a mold to be casted.

Here, in order to improve the high-temperature strength and achieve homogeneity in deformation, it is preferable to give a further heat treatment to the ingot casted. The heat treatment is to eliminate nonuniform casted microstructure (homogenization heat treatment), and the conditions therefor are not particularly limited. The heat treatment may be given in a vacuum at a temperature of 950° C. to 1100° C. for 24 to 48 hours, for example. The heat treatment can eliminate casting strain attributed to the casting speed and nonuniformity in the casted microstructure that occurs in a large-sized ingot. In addition, the heat treatment can reduce the Ni solid solution phase having an fcc microstructure and improve the Vickers' hardness. The heat treatment is therefore suitable for the material of the bearing that operates steadily at high temperature.

Next, the resulting ingot of the intermetallic compound alloy is worked into a predetermined shape to give a bearing. For example, the resulting ingot is cut and machined to give a bearing having a predetermined shape. The cutting and the machining of the ingot are merely exemplification, and the method is not limited to the machining. For example, a well-known method such as plastic working may be applied as appropriate. Alternatively, the materials may be melted and casted directly into the shapes of the inner ring and the outer ring, or the materials may be formed directly into the shapes of the inner ring and the outer ring by a powder metallurgy technique.

Lastly, a bearing is assembled with the inner ring, the outer ring and the rolling elements. As the rolling elements, preferably, those having a size allowing the inner ring and the outer ring to form a predetermined bearing internal space therebetween are selected and obtained.

A heat treatment may be performed after the resulting ingot is cut and machined.

The method for producing the heat-resistant bearing may include the steps of: preparing an ingot containing 25 to 500 ppm by weight of B with respect to a weight of an intermetallic compound having a composition of 100% by atom in total consisting of 10.0 to 12.0% by atom of Si, 1.0 to 9.0% by atom of Ti, 0.5 to 8.5% by atom of Al and a balance made up of Ni excepting impurities; giving a heat treatment to the ingot at 950 to 1100° C.; and forming a bearing with the ingot given the heat treatment.

Alternatively, the method for producing the heat-resistant bearing may include the steps of: preparing an ingot containing 25 to 500 ppm by weight of B with respect to a weight of an intermetallic compound having a composition of 100% by atom in total consisting of 10.0 to 12.0% by atom of Si, 1.0 to 9.0% by atom of Ti, 0.5 to 8.5% by atom of Al and a balance made up of Ni excepting impurities; forming a bearing with the ingot; and giving a heat treatment to the bearing at 950 to 1100° C.

(Examples)

Next, bearings of Examples 1 and 2 were prepared by using the $Ni_3(Si,Ti)$-based intermetallic compound alloys having the compositions shown in Embodiments 1 and 2, respectively, and evaluated according to a rotation test at high temperature. As a result, it has been demonstrated that the bearings of Examples 1 and 2 are able to operate steadily under a high-temperature environment at 500° C.

Here, the bearing of Example 1 was formed of an $Ni_3(Si,Ti)$-based intermetallic compound alloy to which 3 at. % of Ta was added. The addition amount of Ta was set to 3 at. % according to the following experimental results.

FIGS. 3 to 8 are diagrams showing results of property measurements on Ni$_3$(Si,Ti)-based intermetallic compound alloys containing Ta in respective amounts shown in Table 1. (In Table 1, the compositions of these intermetallic compounds are designed so that the total Ti and Ta content will be constant. The B content is an amount expressed in terms of ratio by weight (wt. ppm) to a total weight of an alloy having a composition of 100 at. % in total containing Ni, Si, Ti and Al.)

TABLE 1

| Sample Name | Ni at. % | Si at. % | Ti at. % | Ta at. % | B wt. ppm | Remarks Abbreviated Name Of Sample |
|---|---|---|---|---|---|---|
| NST | 79.5 | 11.0 | 9.5 | — | 50 | "Basic Composition Material" or "Unalloyed" |
| NST-1Ta | 79.5 | 11.0 | 8.5 | 1.0 | 50 | 1Ta |
| NST-2Ta | 79.5 | 11.0 | 7.5 | 2.0 | 50 | 2Ta |
| NST-3Ta | 79.5 | 11.0 | 6.5 | 3.0 | 50 | 3Ta |
| NST-4Ta | 79.5 | 11.0 | 5.5 | 4.0 | 50 | 4Ta |
| NST-5Ta | 79.5 | 11.0 | 4.5 | 5.0 | 50 | 5Ta |
| NST-6Ta | 79.5 | 11.0 | 3.5 | 6.0 | 50 | 6Ta |
| NST-7Ta | 79.5 | 11.0 | 2.5 | 7.0 | 50 | 7Ta |

Figure 3:
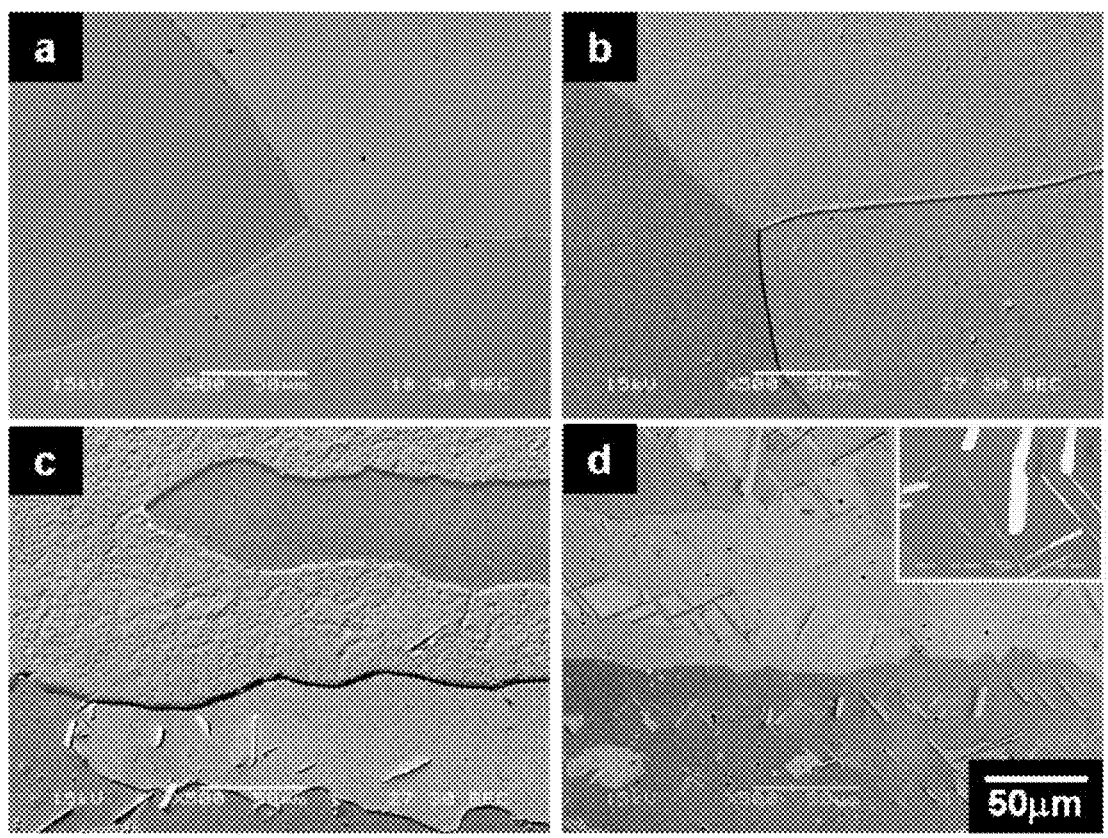
FIG. 3 is SEM photographs of Ta-added $Ni_3(Si,Ti)$-based intermetallic compound alloys used in Example 1 of the present invention. (a) to (d) are reflection electron images (SEM-BE images), in which the addition amount of Ta is 0 at. % (basic composition material) in (a), 5 at. % in (b), 6 at. % in (c) and 7 at. % in (d).
Figure 4:
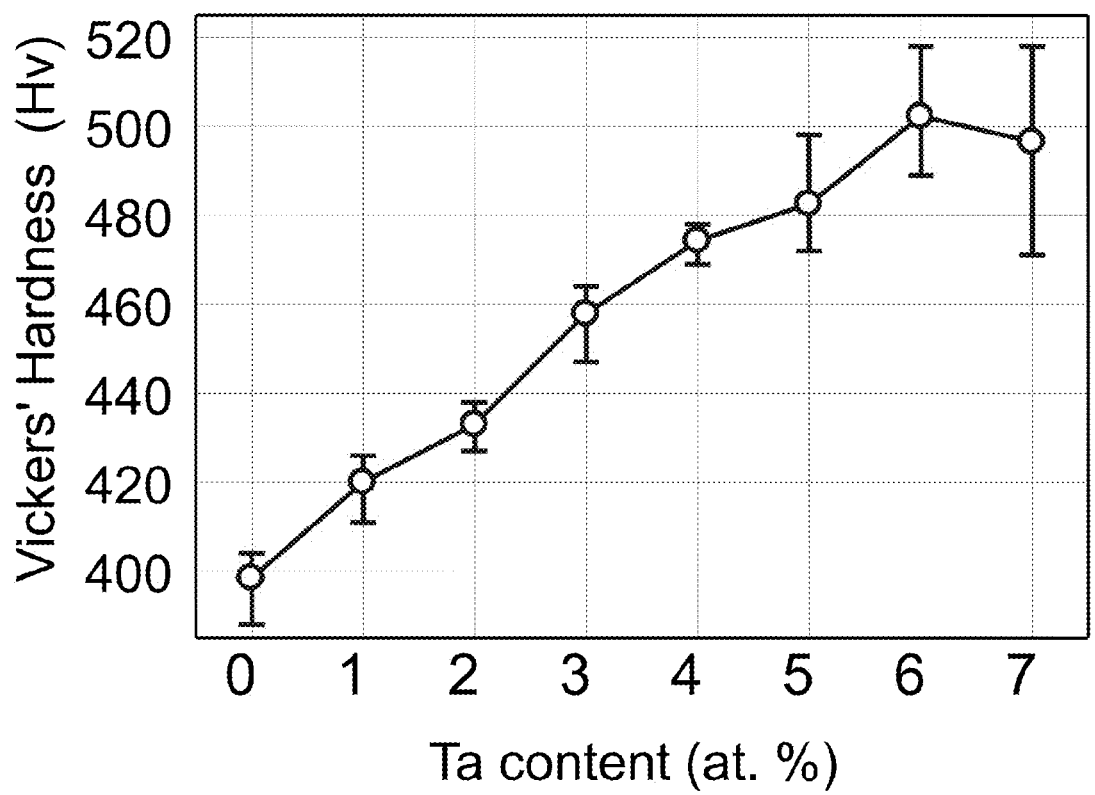
FIG. 4 is a graph showing the relationship between the Vickers' hardness at room temperature and the Ta content for the Ta-added $Ni_3(Si,Ti)$-based intermetallic compound alloys used in Example 1 of the present invention.
Figure 5:
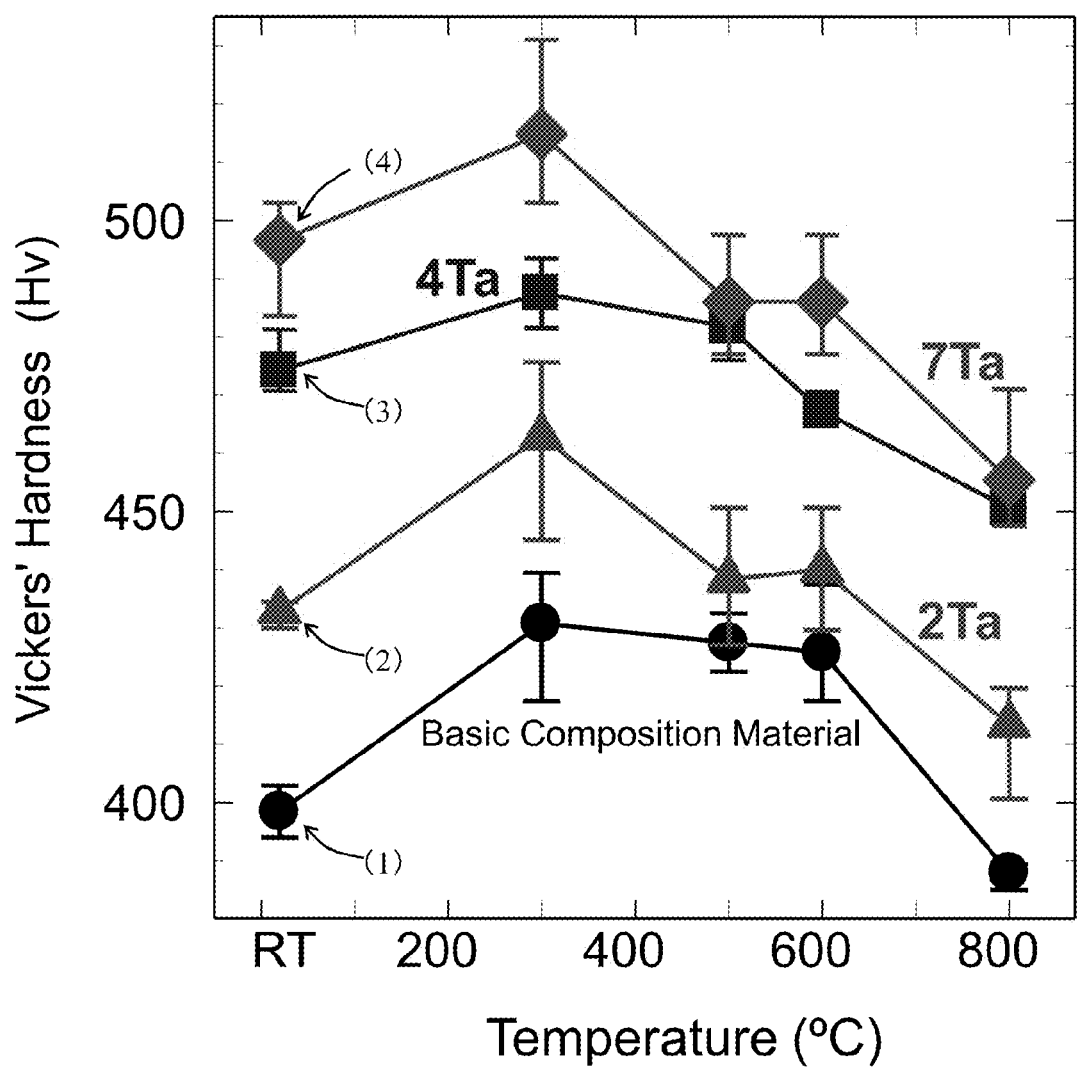
FIG. 5 is a graph showing the relationship between the Vickers' hardness and the temperature for the Ta-added $Ni_3(Si,Ti)$-based intermetallic compound alloys used in Example 1 of the present invention. The addition amount of Ta is 0 at. % (basic composition material) in (1), 2 at. % in (2), 4 at. % in (3) and 7 at. % in (4).
Figure 6:
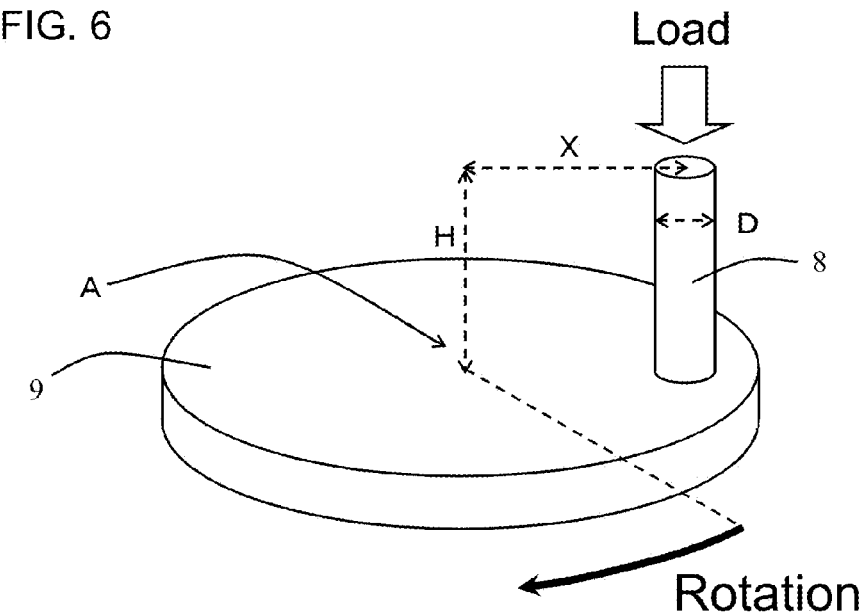
FIG. 6 is a conception diagram for illustrating a pin-on-disk wear test.
Figure 7:
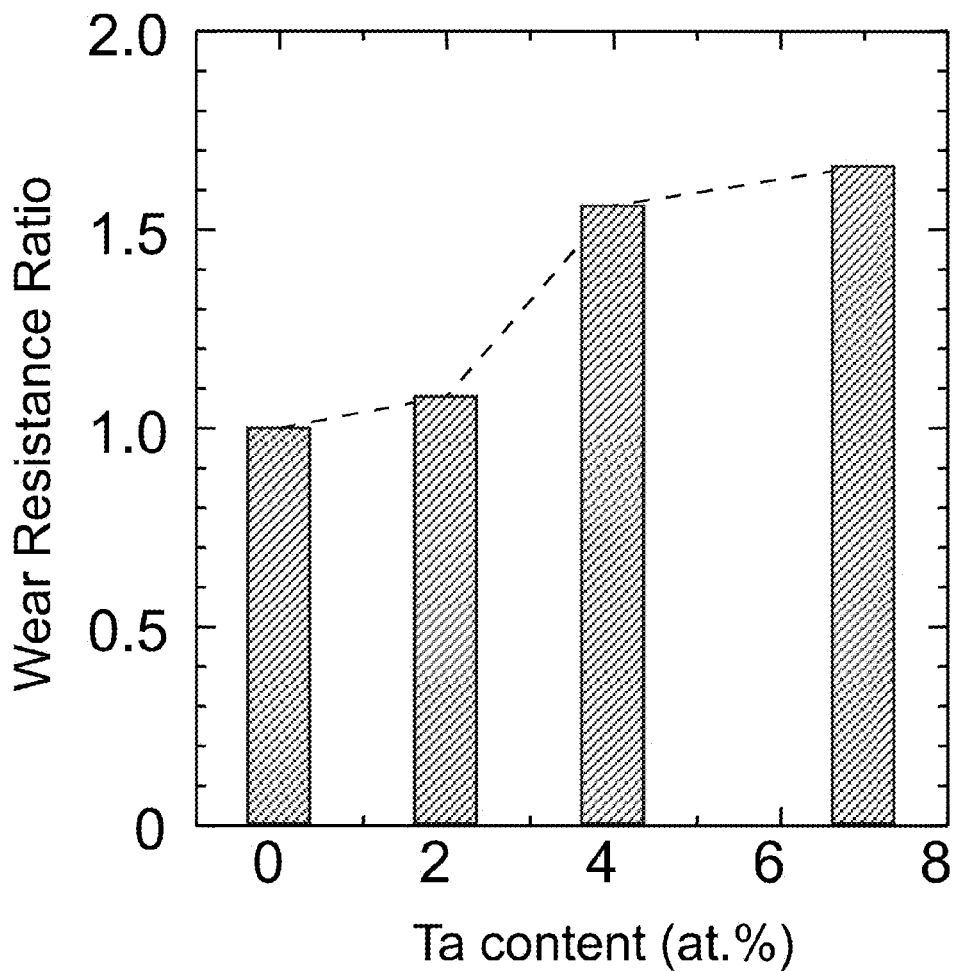
FIG. 7 is a graph showing the relationship between the addition amounts of Ta (2 at. %, 4 at. % and 7 at. %) and the wear resistance ratio where the wear resistance ratio of a sample containing 0 at. % of Ta is 1.
Figure 8:
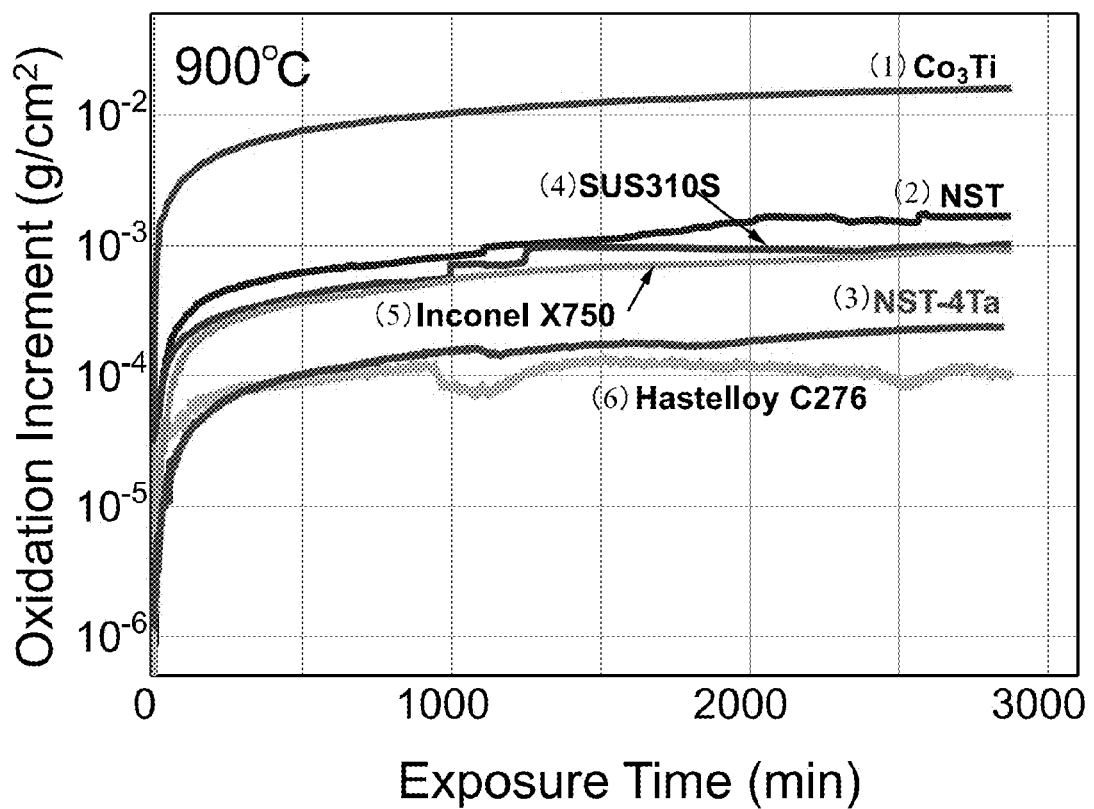
FIG. 8 is a graph showing the relationship between the mass increment and the time according to an oxidation resistance test on the Ta-added $Ni_3(Si,Ti)$-based intermetallic compound alloy used in Example 1 of the present invention. (1) represents a sample of $Co_3Ti$, (2) represents NST (basic composition material of the $Ni_3(Si,Ti)$-based intermetallic compound alloy), (3) represents an $Ni_3(Si,Ti)$-based intermetallic compound alloy to which 4 at. % of Ta was added, (4) represents SUS310S, (5) represents Inconel X750, (6) represents Hastelloy C276, of which (1) and (2), and (4) to (6) are samples to be compared with (3).

FIG. 3 is SEM photographs of Ta-added Ni$_3$(Si,Ti)-based intermetallic compound alloys. FIG. 4 is a graph showing the relationship between the Vickers' hardness at room temperature and the Ta content. FIG. 5 is a graph showing the relationship between the Vickers' hardness and the temperature. FIG. 6 is a conception diagram for illustrating a pin-on-disk wear test. FIG. 7 is a graph showing results of the pin-on-disk wear test. FIG. 8 is a graph showing the relationship between the mass increment and the time according to an oxidation resistance test.

Here, in the Vickers' hardness test in FIG. 4, the load was 1 kg, and the retention time was 20 seconds (room temperature: approximately 25° C.). In the Vickers' hardness test in FIG. 5, the load was 1 kg, the retention time was 20 seconds, and the temperature was raised at a speed of 10° C. per minute in a reducing atmosphere (Ar+approximately 10% H$_2$).

In the pin-on-disk wear test in FIGS. 6 and 7, a cemented carbide (G5) was used for a disk 9, and a pin 8 was obtained by forming each sample into a cylindrical shape. Specifically, the cylindrical pin 8 having a height of 15 mm (H in FIG. 6) and a diameter of 5 mm (D in FIG. 6) was placed on the disk 9 at a distance (X in FIG. 6) of 15 mm from the center of the disk 9 to perform the test. The pin-on-disk wear test was performed in the air at room temperature (approximately 25° C.) for 30 minutes under a load of 100 N, at rotation speed of 300 rpm and by a total sliding distance of 1413.7 m. The test was a dry wear test without the use of lubricating oil. The wear resistance was evaluated according to amounts of mass loss and volume loss of the pin after completing the total sliding distance.

The oxidation resistance test in FIG. 8 was performed by TG-DTA (Thermogravimetry-Differential Thermal Analysis). Specifically, each sample was measured for the mass increment per unit surface area when exposed to the air at 900° C.

FIG. 3 indicates that the L1$_2$ single-phase structure is maintained when the addition amount of Ta is 5 at. % or less, but plate-like Ni$_3$Ta phase are dispersed in the L1$_2$ matrix when the addition amount of Ta is more than 5 at. %.

FIG. 4 indicates that the Vickers' hardness at room temperature increases substantially linearly with increase in the addition amount of Ta. (In FIG. 4, the Vickers' hardness increases until the addition amount of Ta reaches 6 at. %. For example, in FIG. 4, the Vickers' hardness is approximately 430 Hv when the addition amount of Ta is 2 at. %, the Vickers' hardness is approximately 450 to 460 Hv when the addition amount of Ta is 3 at. %, the Vickers' hardness is approximately 480 to 490 Hv when the addition amount of Ta is 5 at. %, and the Vickers' hardness is 510 Hv at the maximum.)

FIG. 5 indicates that the addition of Ta is effective not only for the Vickers' hardness at room temperature but also for the Vickers' hardness at high temperature. (The Vickers' hardness was approximately 440 Hv when the addition amount of Ta was 2 at. %, and the Vickers' hardness was approximately 490 Hv when the addition amount of Ta was 7 at. % at 500° C. or 600° C.) FIGS. 6 and 7 indicate that the wear resistance is improved because of the increase in the Vickers' hardness. In particular, it is indicated that the wear resistance is significantly improved when the addition amount of Ta is more than 2 at. %.

FIG. 8 indicates that the addition of Ta also improves the oxidation resistance.

Since the wear resistance is improved with the increase in the hardness, it is inferred that the bearing performance is better when the hardness is higher. Considering the above-described measurement results, the addition amount of Ta of 3 at. % was employed, where no Ni$_3$Ta phase develops, and both the hardness and the wear resistance are better.

The bearing of Example 2 was formed of an Ni$_3$(Si,Ti)-based intermetallic compound alloy to which 2 at. % of Al was added. The addition amount of Al was set to 2 at. % according to the following experimental results.

FIGS. 9 to 12 are diagrams showing results of property measurements on Ni$_3$(Si,Ti)-based intermetallic compound alloys containing Al in respective amounts shown in Table 2. (In Table 2, the compositions of these intermetallic compounds are designed so that the total Ti and Al content will be constant. The B content is an amount expressed in terms of ratio by weight (wt. ppm) to a total weight of an alloy having a composition of 100 at. % in total containing Ni, Si, Ti and Al.)

TABLE 2

| Sample Name | Ni at. % | Si at. % | Ti at. % | Al at. % | B wt. ppm | Remarks Abbreviated Name Of Sample |
|---|---|---|---|---|---|---|
| NST | 79.5 | 11.0 | 9.5 | — | 50 | "Basic Composition Material" or "Unalloyed" |
| NST-2Al | 79.5 | 11.0 | 7.5 | 2.0 | 50 | 2Al, Al - alloyed, or Al - added |
| NST-4Al | 79.5 | 11.0 | 5.5 | 4.0 | 50 | 4Al |
| NST-6Al | 79.5 | 11.0 | 3.5 | 6.0 | 50 | 6Al |
| NST-8Al | 79.5 | 11.0 | 2.5 | 7.0 | 50 | 8Al |

Figure 9:
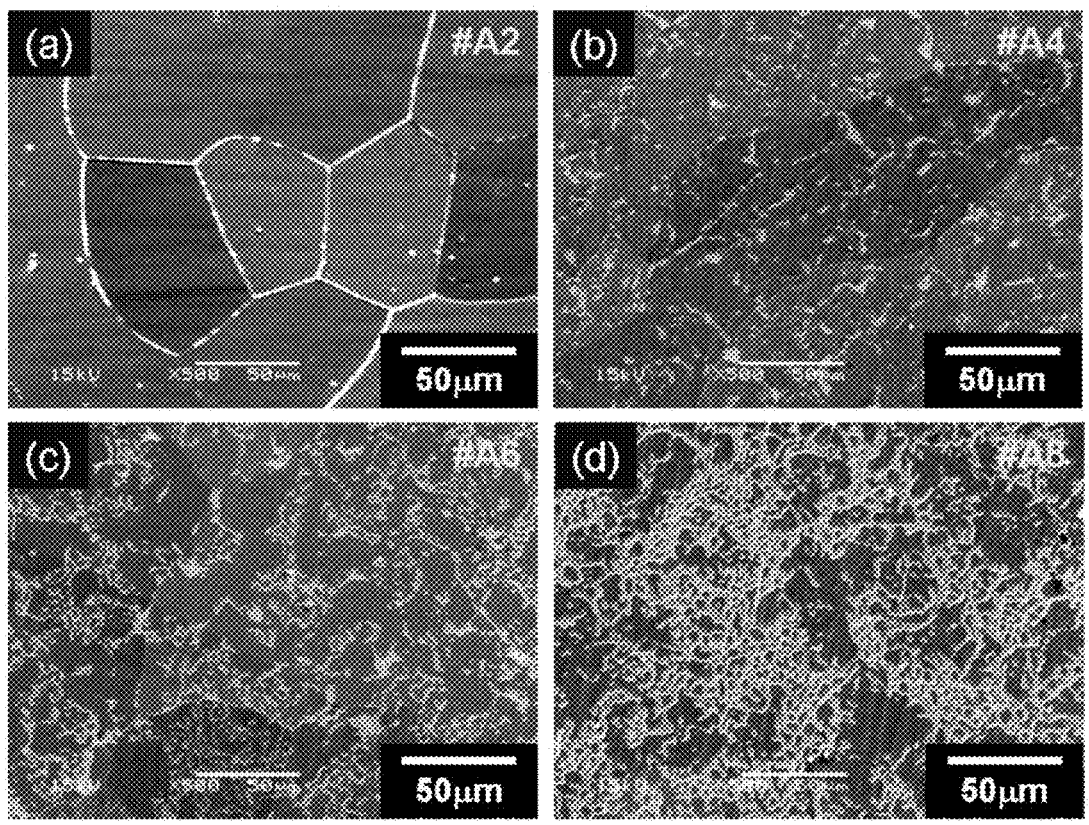
FIG. 9 is SEM photographs of Al-added $Ni_3(Si,Ti)$-based intermetallic compound alloys used in Example 2 of the present invention. (a) to (d) are secondary electron images (SEM-SE images), in which the addition amount of Al is 2 at. % in (a), 4 at. % in (b), 6 at. % in (c) and 8 at. % in (d).
Figure 10:
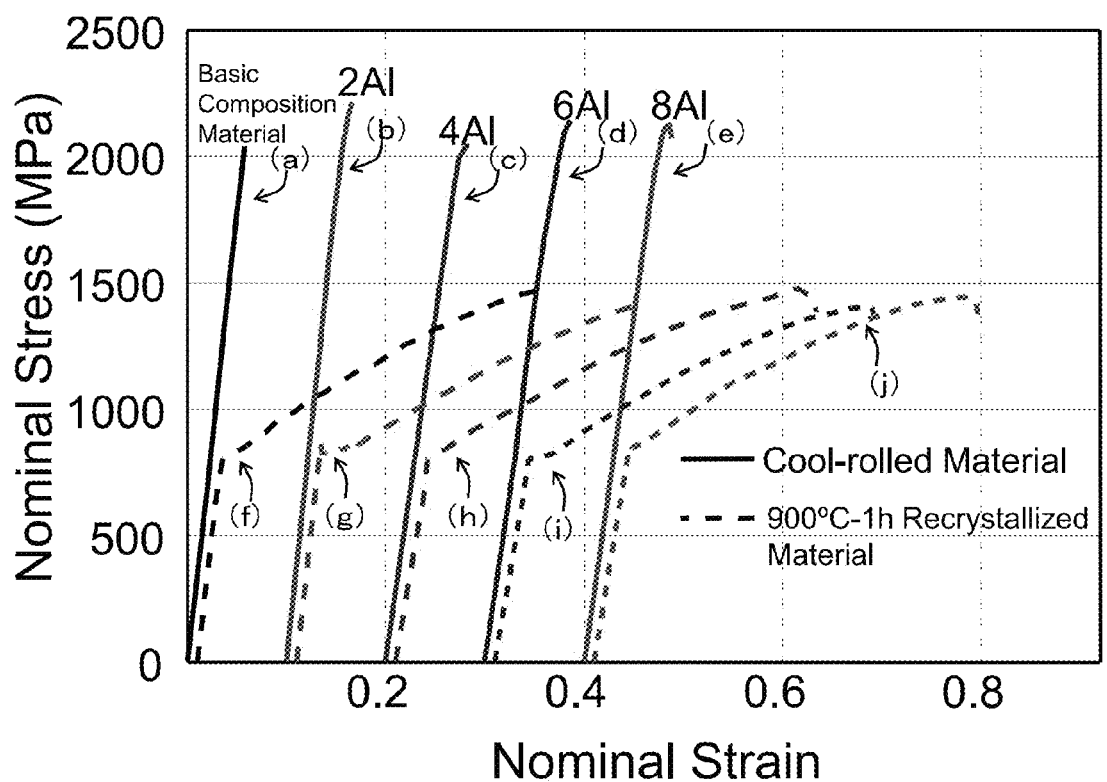
FIG. 10 is nominal stress-nominal strain curves of the Al-added $Ni_3(Si,Ti)$-based intermetallic compound alloys used in Example 2 of the present invention in a tensile test in the air at room temperature. (a) to (e) are curves representing plates subjected to 90% cold-rolling, and (f) to (j) are curves representing recrystallized plates subjected to 90% cold-rolling and then annealing at 900° C. for 1 hour. In these curves, the addition amount of Al is 0 at. % (basic composition material) in (a) and (f), 2 at. % in (b) and (g), 4 at. % in (c) and (h), 6 at. % in (d) and (i), and 8 at. % in (e) and (j).
Figure 11:
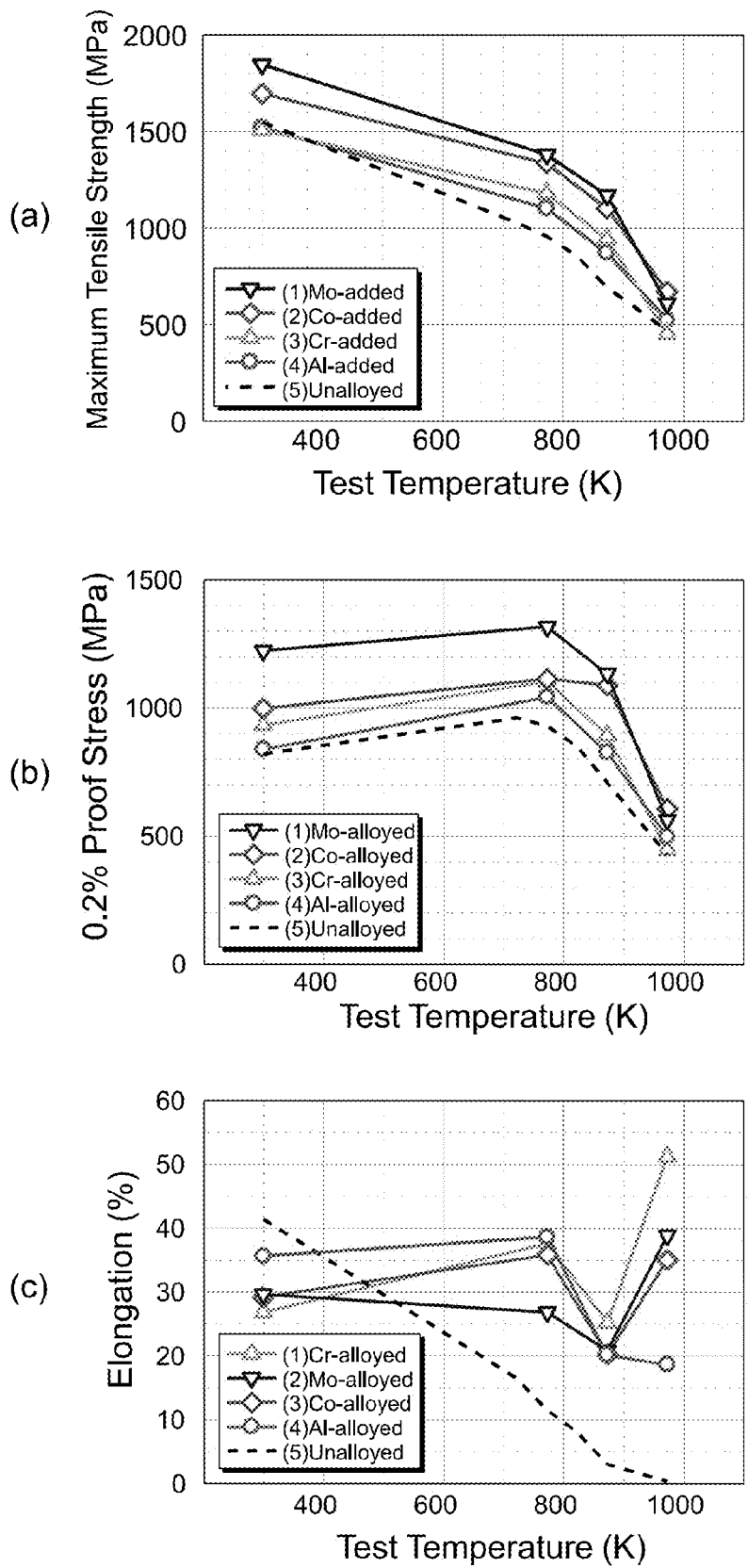
FIG. 11 is graphs showing results of a high-temperature tensile test on the Al-added $Ni_3(Si,Ti)$-based intermetallic compound alloy used in Example 2 of the present invention. The graphs show the relationship between (a) the test temperature and the maximum tensile strength, (b) the test temperature and the 0.2% proof stress, and (c) the test temperature and the elongation for each sample. These graphs show results of a tensile test performed at high temperature and in a vacuum on $Ni_3(Si,Ti)$-based intermetallic compound alloys to which 2 at. % of (1) Mo, (2) Co, (3) Cr or (4) Al was added and on an $Ni_3(Si,Ti)$-based intermetallic compound alloy to which (5) none of these elements was added (basic composition material) subjected to 90% cold-rolling and then recrystallization annealing at 900° C. for 1 hour.
Figure 12:
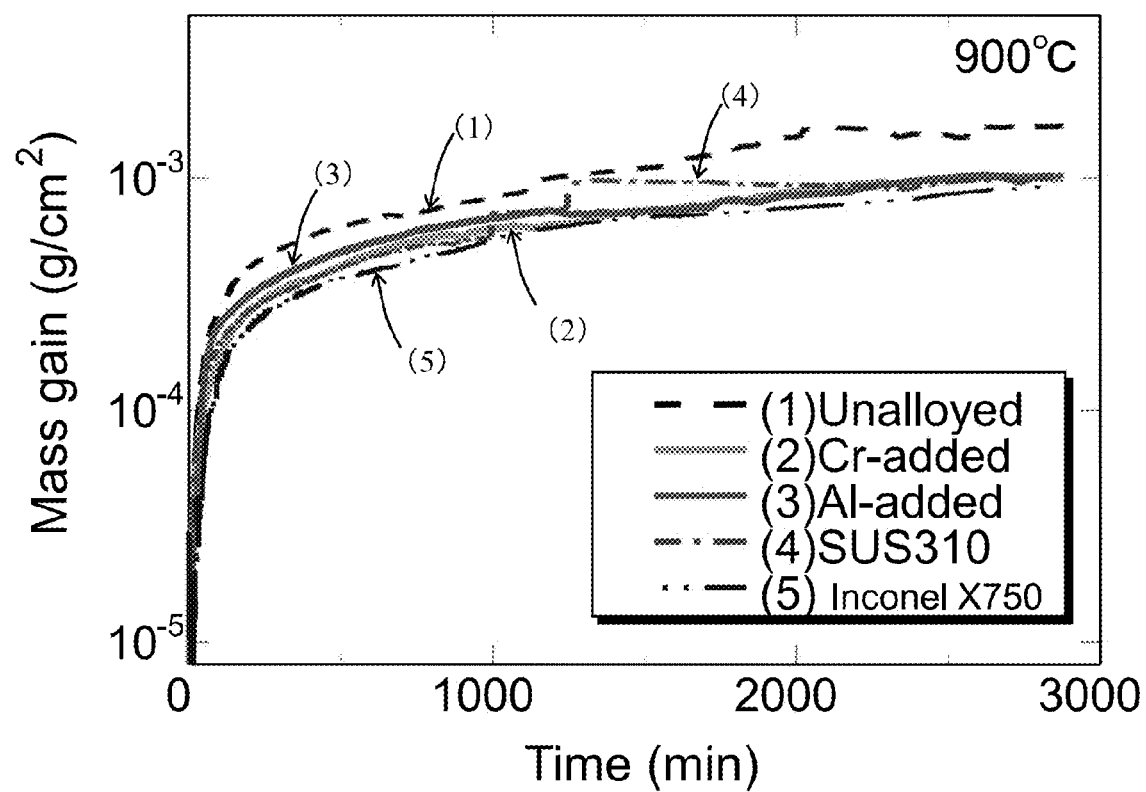
FIG. 12 is a graph showing the relationship between the mass increment and the time according to an oxidation resistance test on the Al-added $Ni_3(Si,Ti)$-based intermetallic compound alloy used in Example 2 of the present invention. (1) represents an $Ni_3(Si,Ti)$-based intermetallic compound alloy to which Cr or Al was not added (basic composition material), (2) represents an $Ni_3(Si,Ti)$-based intermetallic compound alloy to which 2 at. % of Cr was added, (3) represents an $Ni_3(Si,Ti)$-based intermetallic compound alloy to which 2 at. % of Al was added, (4) represents SUS310, (5) represents Inconel X750, of which (1), (2), (4) and (5) are samples to be compared with (3).

FIG. 9 shows SEM photographs of Al-added Ni$_3$(Si,Ti)-based intermetallic compound alloys. FIG. 10 is nominal stress-nominal strain curves of the Al-added Ni$_3$(Si,Ti)-based intermetallic compound alloys in a tensile test in the air at room temperature. FIG. 11 is graphs showing results of a high-temperature tensile test on the Al-added Ni$_3$(Si,Ti)-based intermetallic compound alloy. FIG. 12 is a graph showing the relationship between the mass increment and the time according to an oxidation resistance test on the Al-added Ni$_3$(Si,Ti)-based intermetallic compound alloy.

The tensile test in FIG. 10 was performed in the air at room temperature and at a straining rate of $8.4 \times 10^{-5}$ s$^{-1}$ by using samples each having a length of 10 mm and a width of 4 mm in a gauge portion. The high-temperature tensile test in FIG. 11 was performed in a vacuum at temperatures from room temperature to 700° C. and at a straining rate of $8.4 \times 10^{-5}$ s$^{-1}$ by using samples each having a length of 10 mm and a width of 4 mm in a gauge portion. The oxidation resistance test in FIG. 12 was performed by measuring the oxidation increment in the air at 900° C. Here, "Mo-alloyed", "Co-alloyed" and "Cr-alloyed" in FIGS. 11 and 12 refer to $Ni_3(Si,Ti)$-based intermetallic compound alloys to which 2 at. % Mo, Co or Cr was added, respectively, instead of Al for "NST-2Al" in Table 2, and they are samples to be compared with the $Ni_3(Si,Ti)$-based intermetallic compound alloy to which 2 at. % of Al was added.

FIG. 9 indicates that the same $L1_2$ single-phase structure as in the $Ni_3(Si,Ti)$-based intermetallic compound alloy containing no Al (NST in Table 2) is maintained when 2 at. % of Al is added, and the Ni solid solution phase (white areas in FIG. 9) increases with the increase in the addition amount of Al.

FIG. 10 indicates that the strength properties at room temperature as high as that of the basic composition material ($Ni_3(Si,Ti)$-based intermetallic compound alloy containing no Al, that is, NST in Table 2) is maintained.

FIG. 11 indicates that the ductility can be improved without reducing high-temperature strength properties.

FIG. 12 indicates that the addition of 2 at. % of Al improves the oxidation resistance.

Considering the above-described measurement results, the addition amount of Al of 2 at. % was employed, where the strength properties and the oxidation resistance are better.

(Performance Test)

$Ni_3(Si,Ti)$-based intermetallic compound alloys to which Ta or Al was added in the above-described amounts were prepared by the following method.

(1) Preparation of Ingot

First, raw metals of Ni, Si, Ti, Ta and Al (purity of each metal: 99.9% by weight or more), and B were weighted so as to form the compositions shown in Table 3, and subjected to vacuum induction melting (VIM) to give samples consisting of ingots each having a weight of approximately 8 kg.

Here, the Ta-added $Ni_3(Si,Ti)$-based intermetallic compound alloy is an alloy to be a material of the bearing of Example 1. (The alloy will be referred to as "alloy of Example 1" or "NST-3Ta", and the ingot thereof is referred to as "ingot of Example 1".) The Al-added $Ni_3(Si,Ti)$-based intermetallic compound alloy is an alloy to be a material of the bearing of Example 2. (The alloy will be referred to as "alloy of Example 2" or "NST-2Al", and the ingot thereof is referred to as "ingot of Example 2".)

TABLE 3

| Sample Name | Ni at. % | Si at. % | Ti at. % | Ta at. % | Al at. % | B wt. ppm | Remarks Sample Name |
|---|---|---|---|---|---|---|---|
| Alloy of Example 1 | 79.5 | 11.0 | 6.5 | 3.0 | — | 50 | NST-3Ta |
| Alloy of Example 2 | 79.5 | 11.0 | 7.5 | — | 2.0 | 50 | NST-2Al |

In Table 3, the B content is an amount expressed in terms of ratio by weight (wt. ppm) to a total weight of an alloy having a composition of 100 at. % in total containing Ni, Si, Ti and Al.

As a treatment for eliminating casting segregation and for homogenization, a homogenization heat treatment by a vacuum heat treatment (furnace cooling) at 1050° C. for a retention time of 48 hours was performed. In addition, for microstructure observation and a hardness test, samples were prepared by giving a homogenization heat treatment at 950° C. for 24 hours to ingots prepared in the same manner as in the above-mentioned ingots.

(2) Working into Ball Bearing

Next, each ingot given the homogenization heat treatment at 1050° C. for 48 hours was cut to have a predetermined thickness, and a material obtained in a disc shape was machined to give an inner ring and an outer ring formed of each of the alloys of Examples 1 and 2. Internal circumferential surfaces, external circumferential surfaces, and end faces were subjected to rough-grinding, and raceway surfaces of the inner ring and the outer ring were subjected to super-finish-grinding as final finish.

(3) Assembly of Heat-Resistant Ball Bearing

Silicon nitride ceramic balls are incorporated so that the inner ring and the outer ring prepared as described above form a predetermined bearing internal space therebetween, and a solid lubricant cage was mounted to complete a ball bearing illustrated in FIG. 1. Thus, the bearings of Examples 1 and 2 were prepared.

(Microstructure Observation)

Figure 13:
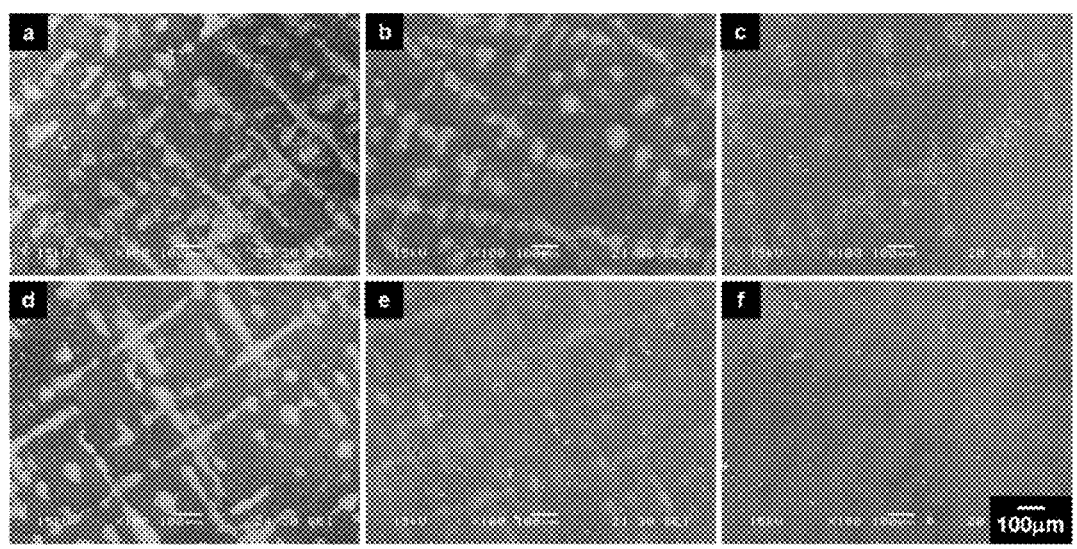
FIG. 13 is SEM photographs (SEM-SE images) of the $Ni_3(Si,Ti)$-based intermetallic compound alloys used in Examples 1 and 2 of the present invention. (a) to (c) show ingots of the alloys to which 2 at. % of Al was added (ingots of Example 2), and (d) to (1) show ingots of the alloys to which 3 at. % of Ta was added (ingots of Example 1). In addition, (a) and (d) are the SEM photographs of the ingots as casted (only casted and given no heat treatment in particular), (b) and (e) are the SEM photographs of the ingots given the homogenization heat treatment at 950° C. for 24 hours, and (c) and (f) are the SEM photographs of the ingots given the homogenization heat treatment at 1050° C. for 48 hours.

The ingots of Examples 1 and 2 were evaluated for the cross-section microstructure. FIG. 13 shows SEM photographs of the $Ni_3(Si,Ti)$-based intermetallic compound alloys of Examples 1 and 2. In FIG. 13, (a) to (c) show the ingots of the alloys to which 2 at. % of Al was added (ingots of Example 2), and (d) to (f) show the ingots of the alloys to which 3 at. % of Ta was added (ingots of Example 1). In addition, (a) and (d) are SEM photographs of the ingots as casted (only casted and given no heat treatment in particular), (b) and (e) are SEM photographs of the ingots given the homogenization heat treatment at 950° C. for 24 hours, and (c) and (f) are SEM photographs of the ingots given the homogenization heat treatment at 1050° C. for 48 hours.

FIGS. 13(a) and (b) indicate that both the Ta-added $Ni_3(Si,Ti)$-based intermetallic compound alloy as casted and the Al-added $Ni_3(Si,Ti)$-based intermetallic compound alloy as casted have a dendrite structure. It is assumed that the core of this dendrite is an Ni solid solution phase having an fcc structure (white areas in FIGS. 13(a) and (d)).

Next, FIGS. 13(b) and (e) indicate that both the alloys have decreased dendrite when given the homogenization heat treatment at 950° C. for 24 hours. In the Ta-added $Ni_3(Si,Ti)$-based intermetallic compound alloy, in particular, the dendrite microstructure disappeared almost completely (see FIG. 13(e)).

Furthermore, FIGS. 13(c) and (f) indicate that the dendrites are further decreased by the homogenization heat treatment at a higher temperature (at 1050° C. for 48 hours). FIGS. 13(c) and (f) indicate that the Ta-added $Ni_3(Si,Ti)$-based intermetallic compound alloy has an $L1_2$ single-phase structure, while the dendrites did not disappear completely in the Al-added $Ni_3(Si,Ti)$-based intermetallic compound alloy.

The results shown in FIG. 13 have indicated that the alloys of Example 1 (NST-3Ta) to which a high concentration of Ta having a higher melting point (melting point: 2996° C.) than Al (melting point: 660° C.) was added seem to diffuse more slowly than the alloys of Example 2 (NST-2Al) do, but the $L1_2$ single-phasing by the homogenization heat treatment is easier in the alloys of Example 1 (NST-3Ta).

(Hardness Test at Room Temperature)

Figure 14:
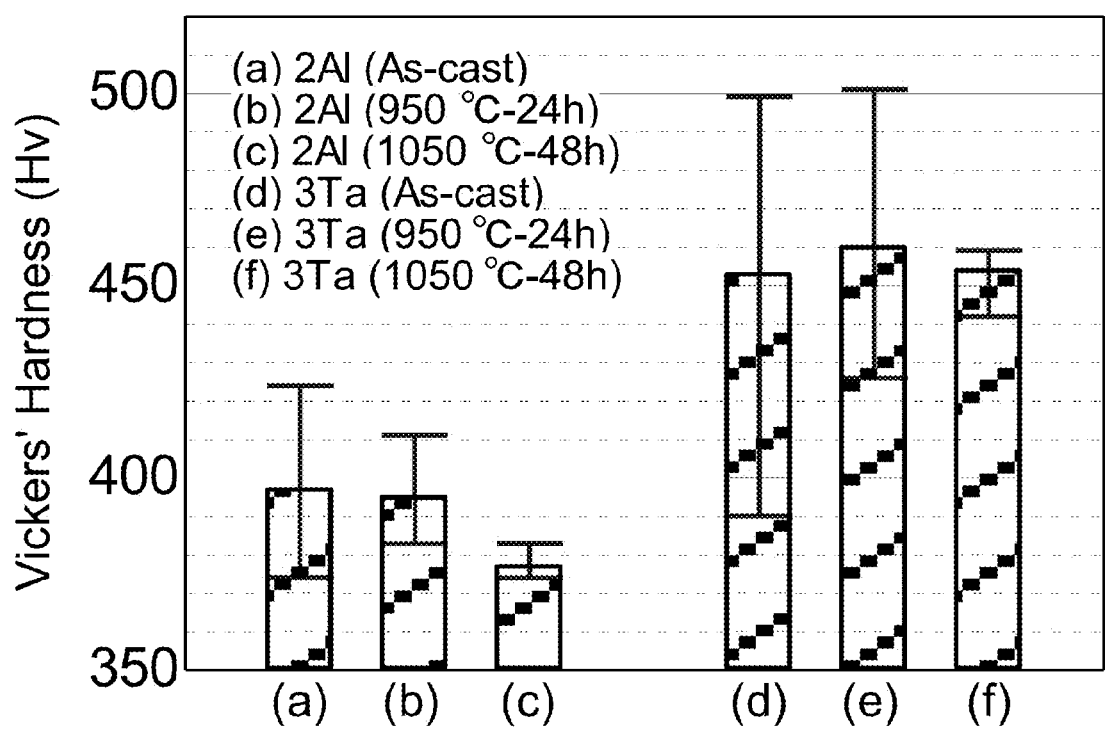
FIG. 14 is a graph showing the relationship between each heat treatment and the Vickers' hardness at room temperature for the $Ni_3(Si,Ti)$-based intermetallic compound alloys used in Examples 1 and 2 of the present invention. (a) to (c) show results of the ingots to which 2 at. % of Al was added, and (d) to (f) show results of the ingots to which 3 at. % of Ta was added. In addition, (a) and (d) are the results of the ingots as casted (only casted and given no heat treatment in particular), (b) and (e) are the results of the ingots given the homogenization heat treatment at 950° C. for 24 hours, and (c) and (f) are the results of the ingots given the homogenization heat treatment at 1050° C. for 48 hours.

In addition, a Vickers' hardness test at room temperature was performed on the ingots of Examples 1 and 2. The load was 1 kg and the retention time was 20 seconds. The results are shown in FIG. 14 and in Table 4. FIG. 14 is a graph showing the relationship between each heat treatment and the Vickers' hardness at room temperature for the $Ni_3(Si,Ti)$- based intermetallic compound alloys used in Examples 1 and 2 of the present invention. (a) to (c) show results of the ingots to which 2 at. % of Al was added, and (d) to (f) show results of the ingots to which 3 at. % of Ta was added. In addition, (a) and (d) are the results of the ingots as casted (only casted and given no heat treatment in particular), (b) and (e) are the results of the ingots given the homogenization heat treatment at 950° C. for 24 hours, and (c) and (f) are the results of the ingots given the homogenization heat treatment at 1050° C. for 48 hours.

TABLE 4

| | Vickers' hardness (Hv) | | |
| --- | --- | --- | --- |
| | Measurement Value | Variability | Remarks |
| (a) 2Al (As-cast) | 397 | 27 −23 | Alloy of Example 2 (As-cast) |
| (b) 2Al (950° C.-24 h) | 395 | 16 −12 | Alloy of Example 2 (homogenization heat treatment at 950° C. for 24 hours) |
| (c) 2Al (1050° C.-48 h) | 377 | 6 −3 | Alloy of Example 2 (homogenization heat treatment at 1050° C. for 48 hours) |
| (d) 3Ta (As-cast) | 453 | 46 −63 | Alloy of Example 1 (As-cast) |
| (e) 3Ta (950° C.-24 h) | 460 | 41 −34 | Alloy of Example 1 (homogenization heat treatment at 950° C. for 24 hours) |
| (f) 3Ta (1050° C.-48 h) | 454 | 5 −12 | Alloy of Example 1 (homogenization heat treatment at 1050° C. for 48 hours) |

FIG. 14 and Table 4 indicate that the alloys of Example 1 (NST-3Ta) are harder than the alloys of Example 2 (NST-2Al). It is also indicated that in both the alloys of Example 1 (NST-3Ta) and the alloys of Example 2 (NST-2Al), the hardness was not changed so significantly but the dispersion of data was held small by the homogenization heat treatment (see error bars in FIG. 14). This is because the homogenization heat treatment decreases the dendrite and homogenizes the microstructures.

Furthermore, a Rockwell-hardness test at room temperature was also performed on the ingots of Examples 1 and 2. The hardness was measured by the C scale. The results are shown in Table 5 (unit: HRC in Table 5).

TABLE 5

| | Sample Name | | Center | | | End Portion | | | Average |
| --- | --- | --- | --- | --- | --- | --- | --- | --- | --- |
| Alloy of Example 1 (NST-3Ta) | Ingot No. 1 | As-cast | 40.0 | 40.5 | | 42.0 | 42.5 | | 41 |
| | | After homogenization heat treatment | 42.5 | 43.0 | 43.5 | 42.0 | 43.0 | 42.5 | 43 |
| | Ingot No. 2 | As-cast | 40.5 | 41.0 | | 42.5 | 41.5 | | 41 |
| | | After homogenization heat treatment | 43.0 | 43.0 | 43.0 | 42.0 | 42.5 | 43.0 | 43 |
| Alloy of Example 2 (NST-2Al) | Ingot No. 3 | As-cast | 37.5 | 38.0 | | 37.0 | 37.5 | | 38 |
| | | After homogenization heat treatment | 37.5 | 37.5 | 34.5 | 35.0 | 35.0 | 35.5 | 36 |
| | Ingot No. 4 | As-cast | 36.0 | 36.5 | | 35.5 | 35.0 | | 36 |
| | | After homogenization heat treatment | 28.0 | 32.5 | 34.5 | 35.0 | 36.0 | 35.5 | 34 | unit: HRC

Here, in Table 5, "Ingot No. 1" to "Ingot No. 4" represent ingot numbers, and two ingots of Example 1 and two ingots of Example 2 were measured. The average values were rounded to the integral numbers. The homogenization heat treatment in Table 5 refers to the heat treatment at 1050° C. for 48 hours.

Table 5 indicates that the alloys of Example 1 (NST-3Ta) are harder than the alloys of Example 2 (NST-2Al) as in the case of FIG. 14. It is also indicated that in both the alloys of Example 1 (NST-3Ta) and the alloys of Example 2 (NST-2Al), the hardness was not changed so significantly but the dispersion of data was held small by the homogenization heat treatment.

(Vickers' Hardness Test at High Temperature)

In addition, a Vickers' hardness test at high temperature was performed on the ingots of Examples 1 and 2. For this test, the ingots given no homogenization heat treatment (as casted) were used. The measurement temperature was room temperature, 300° C., 500° C., 600° C., 800° C. and 900° C.; the load was 1 kg; and the retention time was 20 seconds. The measurement was performed in a reducing atmosphere (Ar+ approximately 10% $H_2$), and the rate of temperature rise was 10° C. per minute. In addition, SUS440C and SUS630 were also measured. (SUS440C has the highest hardness of stainless steels and is a material of a heat-resistant ball bearing for special environment.) The results are shown in FIG. 15 and in Table 6.

TABLE 6

| Temperature (° C.) | NST-3Ta | NST-2Al | SUS630 | SUS440C |
| --- | --- | --- | --- | --- |
| 27 | 448 | 437 | 427 | 788 |
| 300 | 431 | 420 | 388 | 596 |
| 500 | 423 | 396 | 337 | 500 |
| 600 | 410 | 367 | 286 | — |
| 800 | 372 | 353 | 166 | 164 |
| 900 | 337 | 333 | 138 | — |
| Remarks | Ingot of Example 1 | Ingot of Example 2 | | | unit: HV

Figure 15:
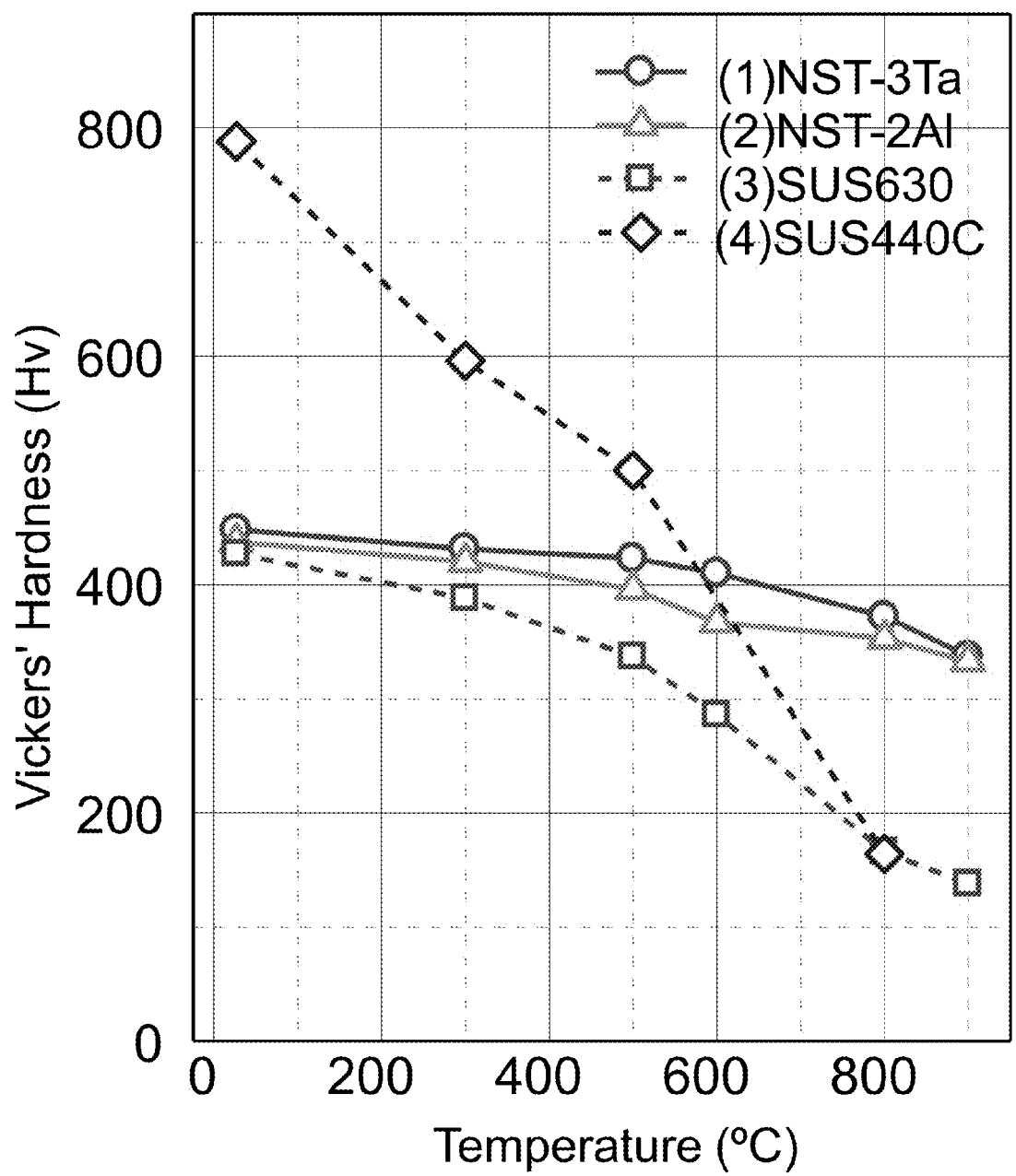
FIG. 15 is a graph showing the relationship between the temperature and the Vickers' hardness for the $Ni_3(Si,Ti)$-based intermetallic compound alloys used in Examples 1 and 2 of the present invention. (1) represents the ingot to which 3 at. % of Ta was added, (2) represents the ingot to which 2 at. % of Al was added, (3) represents SUS630, (4) represents SUS440C, of which (3) and (4) are samples to be compared with (1) and (2).

FIG. 15 is a graph showing the relationship between the temperature and the Vickers' hardness for the $Ni_3(Si,Ti)$-based intermetallic compound alloys used in Examples 1 and 2 of the present invention. In FIG. 15, (1) represents the ingot to which 3 at. % of Ta was added, (2) represents the ingot to which 2 at. % of Al was added, (3) represents SUS63O, (4) represents SUS440C, of which (3) and (4) are samples to be compared with (1) and (2).

FIG. 15 and Table 6 indicate that both the alloy of Example 1 (NST-3Ta) and the alloy of Example 2 (NST-2Al) have a hardness which is comparable to that of SUS63O and which is approximately half that of SUS440C at room temperature, and have a hardness which is higher than those of SUS63O and SUS440C at 600° C. or higher. While the measurement time of the Vickers' hardness test at high temperature is short, the actual operation time of a bearing is long. In actual bearings, therefore, the superiority of the alloy of Example 1 (NST-3Ta) and the alloy of Example 2 (NST-2Al) to SUS630 and SUS440C is expected to be more significant.

(Heat Expansion Coefficient Measurement)

Figure 16:
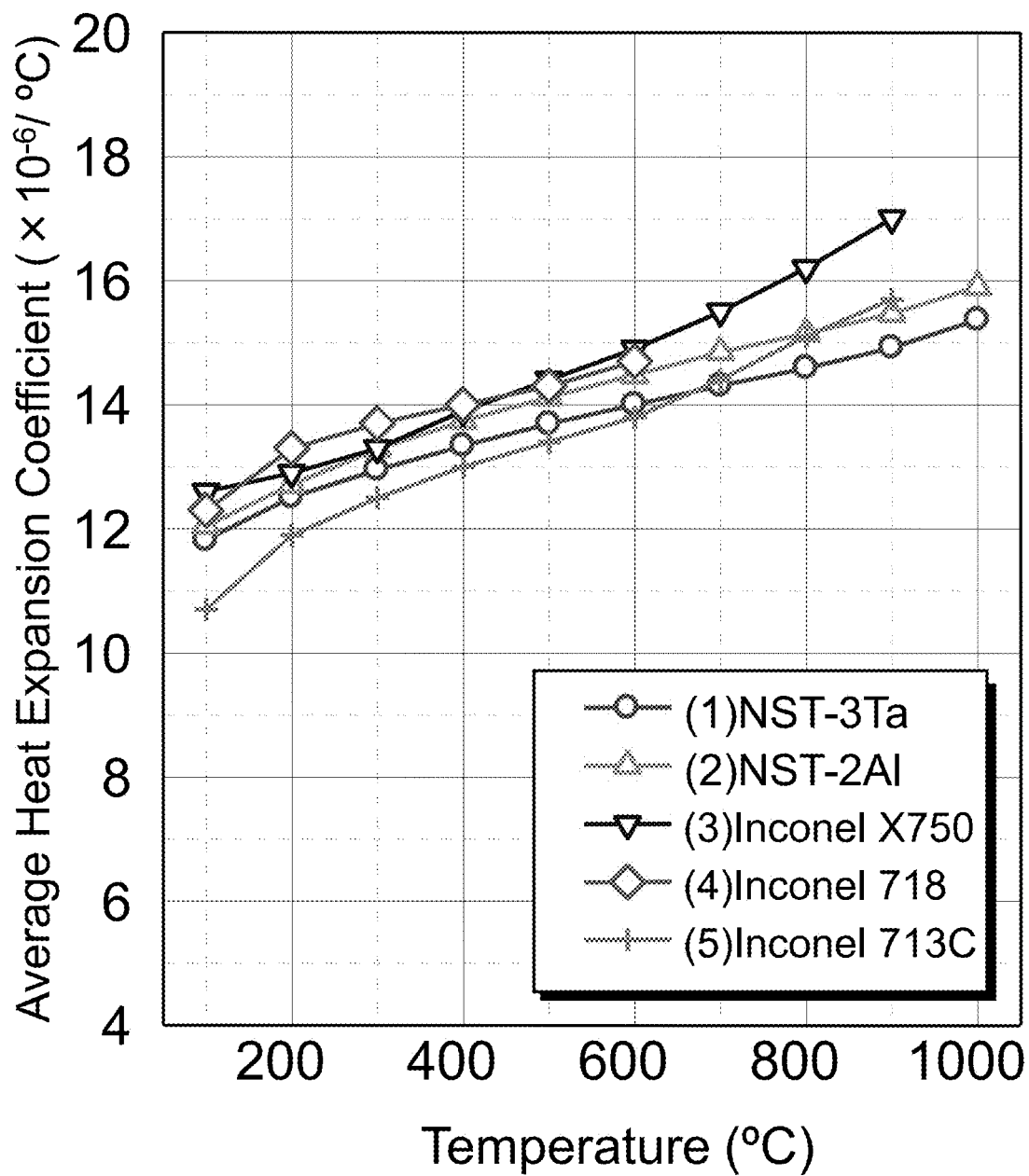
FIG. 16 is a graph showing the relationship between the temperature and the average heat expansion coefficient for the $Ni_3(Si,Ti)$-based intermetallic compound alloys used in Examples 1 and 2 of the present invention. (1) represents the ingot to which 3 at. % of Ta was added, (2) represents the ingot to which 2 at. % of Al was added, (3) represents Inconel X750, (4) represents Inconel 718, and (5) represents Inconel 713C, of which (3) to (5) are samples to be compared with (1) and (2).

The ingots of Examples 1 and 2 were further measured for the heat expansion coefficient. The results are shown in FIG. 16. FIG. 16 is a graph showing the relationship between the temperature and the heat expansion coefficient for the $Ni_3(Si, Ti)$-based intermetallic compound alloys used in Examples 1 and 2 of the present invention. (1) represents the ingot to which 3 at. % of Ta was added, (2) represents the ingot to which 2 at. % of Al was added, (3) represents Inconel X750, (4) represents Inconel 718, and (5) represents Inconel 713C, of which (3) to (5) are samples to be compared with (1) and (2).

FIG. 16 indicates that the ingots have substantially the same heat expansion coefficient values as commercially available nickel alloys. The values are enough for compatibility with ceramic rolling elements.

(Rotation Test at High Temperature)

A rotation test at high temperature was performed on Examples 1 and 2 (ball bearings with the use of the inner rings and the outer rings of Examples 1 and 2). As a comparative example, a bearing was made of SUS440C and also evaluated. The rotation test at high temperature was performed. (SUS440C is a hard material showing the highest hardness of stainless steels.)

Specifically, the bearings were rotated under a high-temperature environment, and thereafter evaluated according to their appearance and sizes measured. A ball bearing which was assembled from an inner ring and an outer ring formed of SUS440C (Fe-18Cr-1C) and which has the same shape as the bearings of Examples was also tested in the same manner and evaluated.

The test was performed under conditions of a temperature of 500° C., a load of 60 kgf and a rotation speed of 166 $min^{-1}$ (setting: 5000 DN).

The specification of the ball bearings was 6206Y3. Silicon nitride ceramic was used for the rolling elements (ceramic balls of ⅜ inches (9.525 mm), product number: FYH-SN)), and BS10609 62R-06 (produced by KOGI CORPORATION Co., Ltd.) was used as the cage. Table 7 shows the configuration and so on of each bearing.

TABLE 7

| | Comparative Example | Example 1 | Example 2 |
|---|---|---|---|
| Test Number | DUT-10-H06 | DUT-10-H07 | DUT-10-H08 |
| Material Of Inner And Outer Rings | SUS440C | Intermetallic Compound Alloy NST-3Ta | Intermetallic Compound Alloy NST-2Al |
| Cage | KOGI BS10609 | KOGI BS10609 | KOGI BS10609 |
| Rolling Elements | Silicon Nitride Ceramic | Silicon Nitride Ceramic | Silicon Nitride Ceramic |
| Test Time | 634 hr | 1000 hr | 1000 hr |

Test numbers were given to Comparative Example, Example 1 and Example 2 as shown in Table 7. "10-H06", "10-H07" and "10-H08" in FIGS. 17 to 25 correspond to Test numbers "DUT-10-H06", "DUT-10-H07" and "DUT-10-H08", respectively.

The test time was 1000 hours. Despite the conditions of 500° C. and 1000 hours, Examples 1 and 2 were smoothly rotated by hand and maintained their good condition when in a high-temperature state after the rotation test was stopped (that is, after the 1000-hour test). (They came into a locked state as their internal clearances were eliminated when the temperature thereof was lowered to room temperature.)

On the other hand, Comparative Example (bearing with the use of the inner and outer rings formed of SUS440C) was broken 634 hours after the start of the test as its internal clearance was enlarged too much. The test on Comparative Example was therefore terminated 634 hours after the start. The results are shown in FIGS. 17 to 25 and in Table 8.

Figure 17:
FIG. 17 is photographs showing states of a bearing according to Comparative Example (ball bearing including inner and outer rings formed of SUS440C) before and after a rotation test at high temperature. (1) shows the state before the rotation test at high temperature, and (2) shows the state after the rotation test at high temperature.
Figure 17:
Figure 18:
FIG. 18 is photographs showing states of a bearing according to Example 1 (ball bearing including inner and outer rings formed of the Ta-added $Ni_3(Si,Ti)$-based intermetallic compound alloy) before and after the rotation test at high temperature. (1) shows the state before the rotation test at high temperature, and (2) shows the state after the rotation test at high temperature.
Figure 18:
Figure 19:
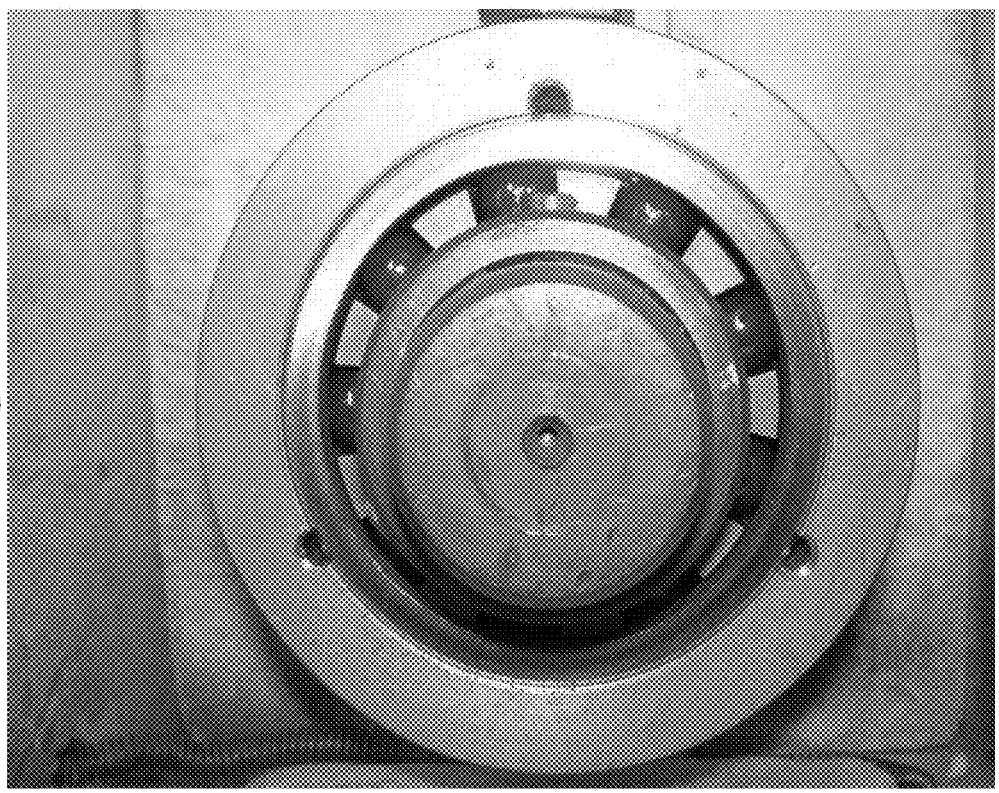
FIG. 19 is photographs showing states of a bearing according to Example 2 (ball bearing including inner and outer rings formed of the Al-added $Ni_3(Si,Ti)$-based intermetallic compound alloy) before and after the rotation test at high temperature. (1) shows the state before the rotation test at high temperature, and (2) shows the state after the rotation test at high temperature.
Figure 19:
Figure 20:
FIG. 20 is a photograph showing a state of each component when the bearing according to Comparative Example (ball bearing including the inner and outer rings formed of SUS440C) was disassembled after the rotation test at high temperature.
Figure 21:
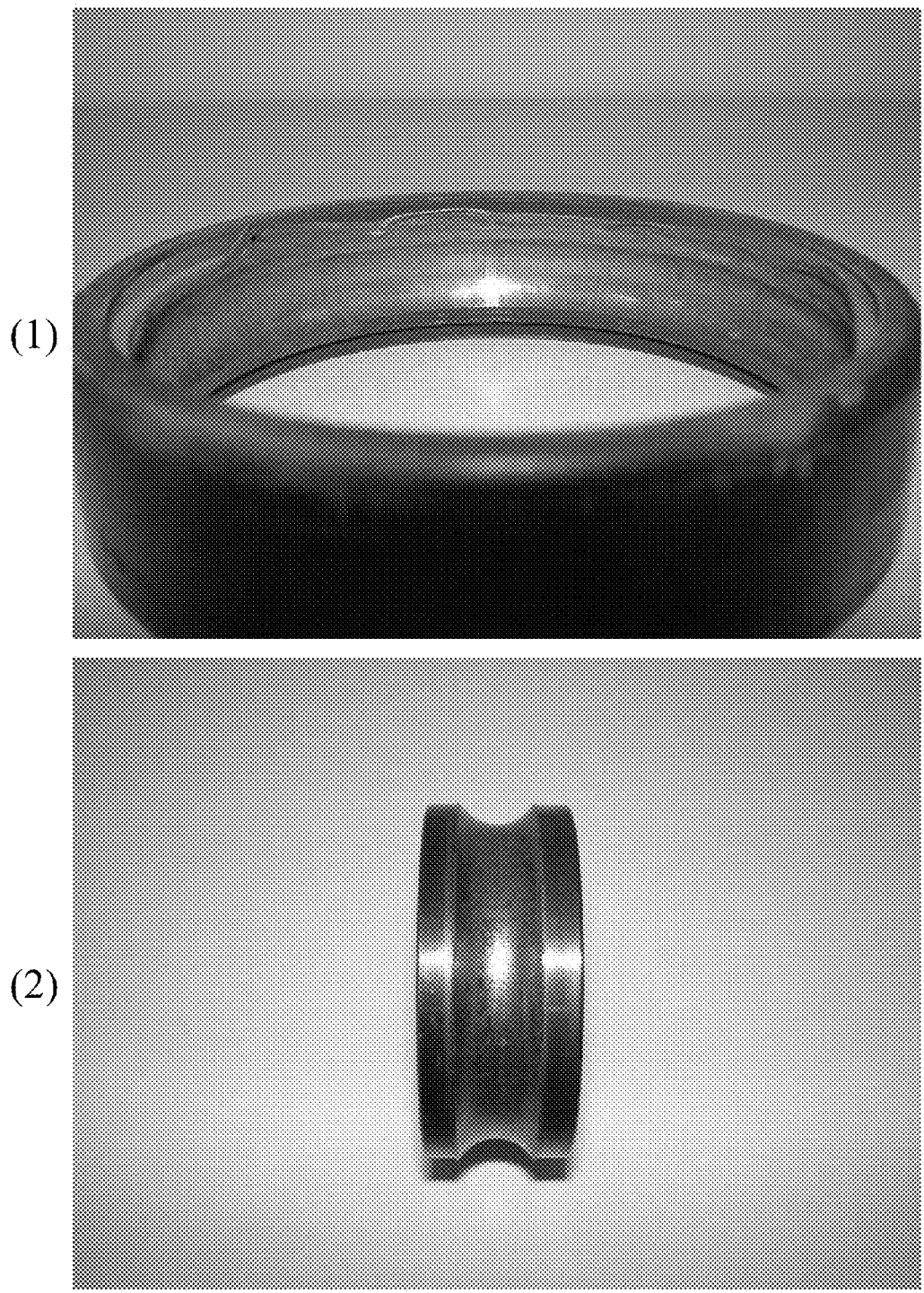
FIG. 21 is photographs showing states of the inner ring and the outer ring when the bearing according to Comparative Example (ball bearing including the inner and outer rings formed of SUS440C) was disassembled after the rotation test at high temperature. (1) shows the outer ring, and (2) shows the inner ring.
Figure 22:
FIG. 22 is a photograph showing a state of each component when the bearing according to Example 1 (ball bearing including the inner and outer rings formed of the Ta-added $Ni_3(Si,Ti)$-based intermetallic compound alloy) was disassembled after the rotation test at high temperature.
Figure 23:
FIG. 23 is photographs showing states of the inner ring and the outer ring when the bearing according to Example 1 (ball bearing including the inner and outer rings formed of the Ta-added $Ni_3(Si,Ti)$-based intermetallic compound alloy) was disassembled after the rotation test at high temperature. (1) shows the outer ring, and (2) shows the inner ring.
Figure 23:
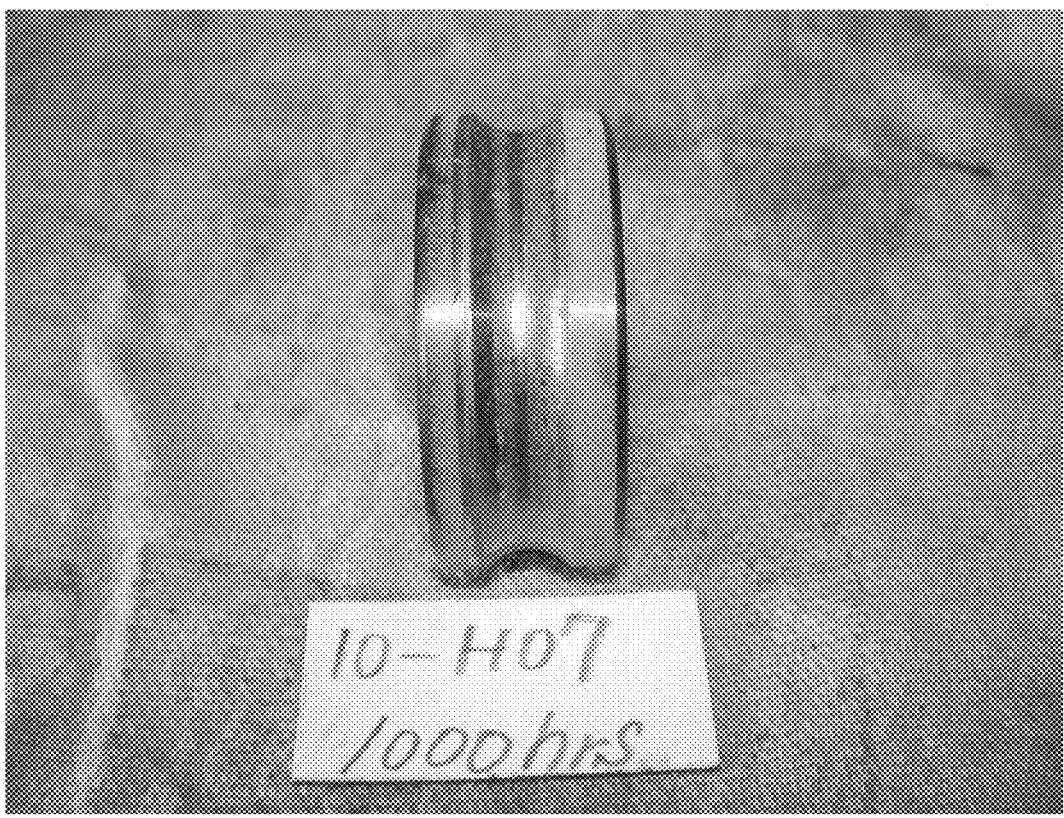
Figure 24:
FIG. 24 is a photograph showing a state of each component when the bearing according to Example 2 (ball bearing including the inner and outer rings formed of the Al-added $Ni_3(Si,Ti)$-based intermetallic compound alloy) was disassembled after the rotation test at high temperature.
Figure 25:
FIG. 25 is photographs showing states of the inner ring and the outer ring when the bearing according to Example 2 (ball bearing including the inner and outer rings formed of the Al-added $Ni_3(Si,Ti)$-based intermetallic compound alloy) was disassembled after the rotation test at high temperature. (1) shows the outer ring, and (2) shows the inner ring.
Figure 25:
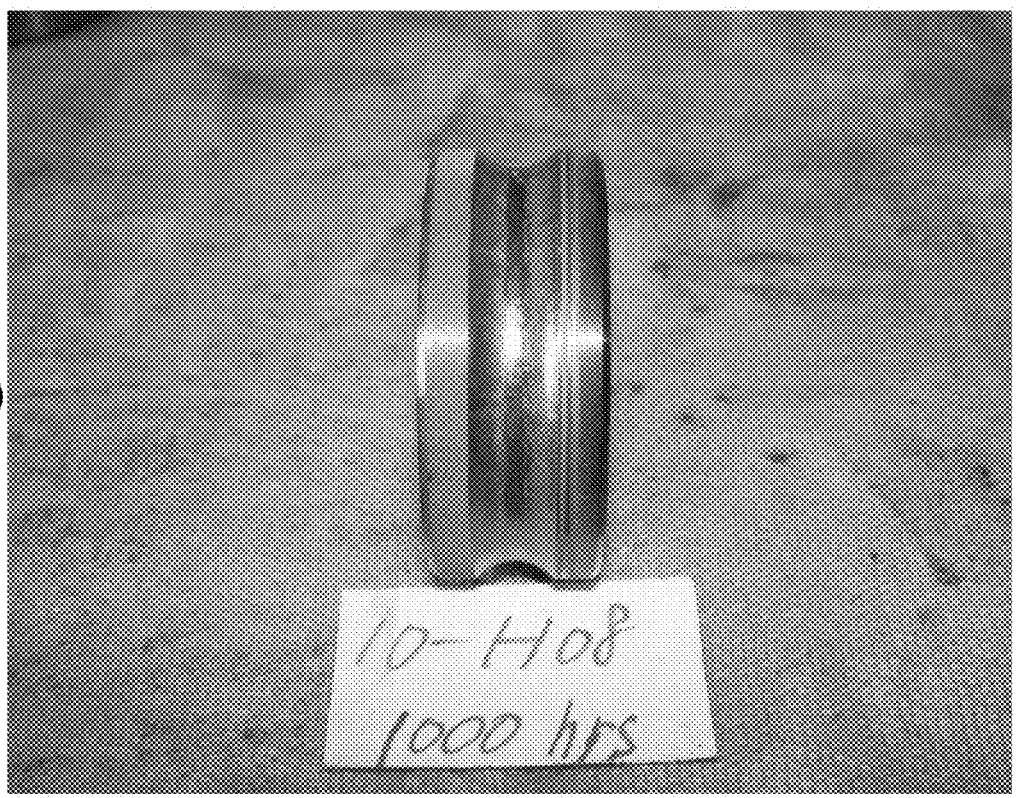

FIGS. 17 to 19 are photographs showing the states of each bearing before and after the rotation test at high temperature. FIGS. 20 to 25 are photographs showing the states of each component when each bearing is disassembled after the rotation test at high temperature. Table 8 shows the results of a wear loss measurement on the inner rings and the outer rings after the rotation test at high temperature.

TABLE 8

| | | Comparative Example | Example 1 | Example 2 |
|---|---|---|---|---|
| Test Number | | DUT-10-H06 | DUT-10-H07 | DUT-10-H08 |
| Bearing Internal Clearance Initial Set Value: 75 μm | | 1050~1450 μm | 0 μm | 0 μm |
| Hardness (HRC) | Before Test | 59.5 | 41.5 | 36.5 |
| | After Test | 38.5 | 42.5 | 40.0 |

FIGS. 17 to 19 indicate that Comparative Example generated a large amount of wear debris, whereas Examples 1 and 2 hardly generated wear debris. A slight amount of powder (greenish brown) was observed in FIGS. 18 and 19, which is assumed to be Ni oxide from the oxidized alloys of Examples 1 and 2.

FIGS. 20 to 25 indicate that the inner ring and the outer ring of Comparative Example are different from the inner rings and the outer rings of Examples 1 and 2 in the wear of the raceway grooves, though both of them were oxidized, and lost their metallic color and turned black in the rotation test at high temperature. In Comparative Example, the raceway grooves of the bearing were worn significantly. In Examples 1 and 2, on the other hand, the base metallic material of the bearing itself was hardly worn, while glassy deposit from the cage was observed on the raceway grooves and on the rolling elements of the bearing (thickness of the deposit on the rolling elements: approximately 7 μm). In addition, no defect and no seizure were observed in the raceway grooves.

The glassy deposit from the cage functions to reduce wear of the inner and outer rings and of the rolling elements at high temperature. However, the deposit reduced the bearing internal space and caused the bearing to be in a locked state when the bearing was no longer thermally expanded once at room temperature.

Table 8 indicates that the bearing internal clearance of Comparative Example increased to be 1050 μm or more, whereas the bearing internal clearances of Examples 1 and 2 did not change, staying at an initial set value. The hardness (Rockwell hardness) of Comparative Example was reduced after the test (the value of the hardness decreased), whereas the hardness of Examples 1 and 2 hardly changed.

Figure 26:
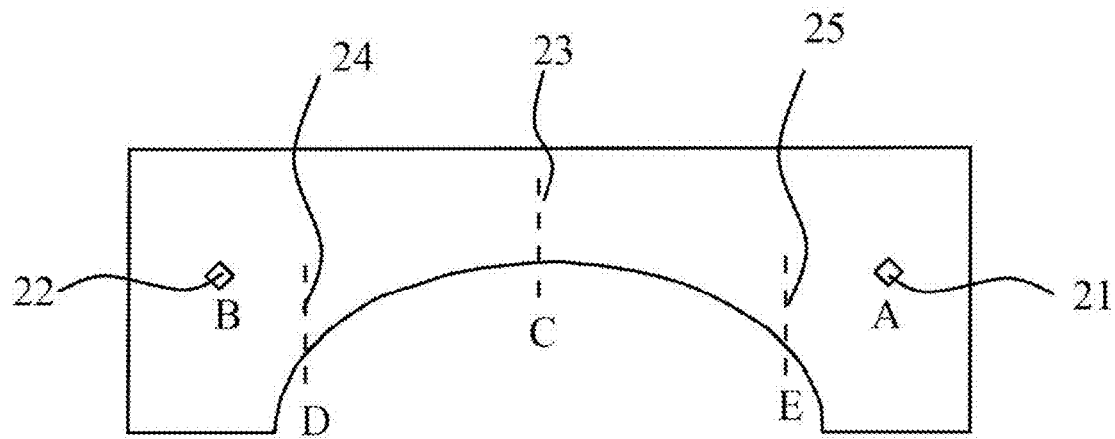
FIG. 26 is a diagram for illustrating areas of a Vickers' hardness measurement in cross sections of the inner rings of Examples 1 and 2 after the rotation test at high temperature.

After the completion of the rotation test at high temperature for 1000 hours, the inner rings of Examples 1 and 2 were cut with a wire-EDM, and cross sections thereof were measured for the Vickers' hardness to find out a factor affecting the high-temperature wear resistance of Examples 1 and 2. The Vickers' hardness test was performed at a load of 100 g and for a retention time of 20 seconds in a room-temperature environment. (A micro-Vickers hardness testing machine was used.) FIG. 26 shows measurement points, and Tables 9 and 10 show Vickers' hardness values obtained.

FIG. 26 is a diagram for illustrating areas of the Vickers' hardness measurement in the cross sections of the inner rings of Examples 1 and 2 after the rotation test at high temperature. Table 9 shows the Vickers' hardness in the cross section of the inner ring of Example 1, and Table 10 shows the Vickers' hardness in the cross section of the inner ring of Example 2.

In FIG. 26, a measurement point A (reference numeral 21) and a measurement point B (reference numeral 22) correspond to insides of the inner rings (centers of the cross sections) of Examples 1 and 2. A measurement area C (reference numeral 23) corresponds to a center of the raceway groove of the inner ring, and a measurement area D (reference numeral 24) and a measurement area E (reference numeral 25) correspond to each end portion of the raceway groove of the inner ring. The center of the raceway groove and the end portions of the raceway groove are portions that are in contact with the rolling elements (that is, ceramic balls). In particular, the former, the center of the raceway groove, is a portion that is in intense contact with the rolling elements. The measurement areas C to E each include a plurality of points as measurement points along each broken line in FIG. 26, and the positions thereof are indicated as "position relative to surface" in Tables 9 and 10. Lengths (a) and (b) in Tables 9 and 10 each represent a length of a diagonal line of Vickers indentation by an indenter of the Vickers' hardness test.

TABLE 9

| Measurement Point | Position Relative To Surface (mm) | Length (a) (μm) | Length (b) (μm) | Hardness (HV) |
|---|---|---|---|---|
| A | Center | 21.9 | 23.6 | 360 |
| B | Center | 22.0 | 23.1 | 366 |
| C-1 | 0.1 | 17.0 | 18.3 | 598 |
| C-2 | 0.2 | 18.4 | 19.8 | 510 |
| C-3 | 0.3 | 21.4 | 20.3 | 428 |
| C-4 | 0.4 | 24.0 | 23.4 | 331 |
| C-5 | 0.5 | 25.1 | 23.9 | 310 |
| C-6 | 0.6 | 21.0 | 21.5 | 411 |
| D-1 | 0.1 | 19.9 | 20.9 | 446 |
| D-2 | 0.2 | 24.2 | 24.6 | 312 |
| D-3 | 0.3 | 21.0 | 22.0 | 401 |
| D-4 | 0.4 | 22.0 | 23.4 | 361 |
| D-5 | 0.5 | 22.1 | 22.6 | 373 |
| E-1 | 0.1 | 19.9 | 23.4 | 399 |
| E-2 | 0.2 | 22.3 | 22.5 | 370 |
| E-3 | 0.3 | 21.6 | 23.1 | 372 |
| E-4 | 0.4 | 19.3 | 20.0 | 483 |
| E-5 | 0.5 | 20.6 | 21.4 | 422 |
| E-6 | 0.6 | 20.3 | 20.0 | 458 |

TABLE 10

| Measurement Point | Position Relative To Surface (mm) | Length (a) (μm) | Length (b) (μm) | Hardness (HV) |
|---|---|---|---|---|
| A | Center | 21.2 | 21.9 | 399 |
| B | Center | 20.9 | 21.6 | 411 |
| C-1 | 0.1 | 17.9 | 19.0 | 545 |
| C-2 | 0.2 | 20.5 | 22.1 | 410 |
| C-3 | 0.3 | 21.6 | 22.1 | 390 |
| C-4 | 0.4 | 23.1 | 23.5 | 342 |
| C-5 | 0.5 | 21.2 | 21.6 | 407 |
| D-1 | 0.1 | 20.1 | 20.4 | 452 |
| D-2 | 0.2 | 20.9 | 21.3 | 419 |
| D-3 | 0.3 | 22.7 | 23.1 | 354 |
| D-4 | 0.4 | 20.7 | 21.1 | 425 |
| D-5 | 0.5 | 23.0 | 23.9 | 338 |
| E-1 | 0.1 | 20.6 | 21.7 | 416 |
| E-2 | 0.2 | 20.9 | 22.6 | 394 |
| E-3 | 0.3 | 22.6 | 23.6 | 349 |
| E-4 | 0.4 | 22.6 | 22.9 | 359 |
| E-5 | 0.5 | 21.2 | 22.0 | 399 |

Tables 9 and 10 indicate that both Examples 1 and 2 were increased in Vickers' hardness in surfaces (position relative to surface: 0.1 mm) of the measurement areas C to E (reference numerals 23 to 25). For example, compared with the measurement points A and B, C-1 of Example 1 has a 232 to 238 larger Vickers' hardness value. Likewise, C-1 of Example 2 has a 136 to 146 larger Vickers' hardness value. Furthermore, both Examples 1 and 2 generally have increased Vickers' hardness values around the surfaces of the raceway grooves including the end portions of the raceway grooves (see position relative to surface: 0.1 mm of measurement areas C to E; this is particularly significant in the measurement area C that is in intense contact with the rolling elements).

According to the results, it is inferred that the rolling elements rolling along the raceway grooves work-hardened the material of the inner and outer rings of Examples 1 and 2, that is, Ta or Al-added $Ni_3(Si,Ti)$-based intermetallic compound alloy, and this work-hardening phenomenon is a factor of the extended lives of the bearings of Examples 1 and 2. This phenomenon was not observed in SUS440C and the like shown in FIG. 15, and this phenomenon indicates that Ta or Al-added $Ni_3(Si,Ti)$-based intermetallic compound alloy is a material suitable for a heat-resistant bearing.

Figure 27:
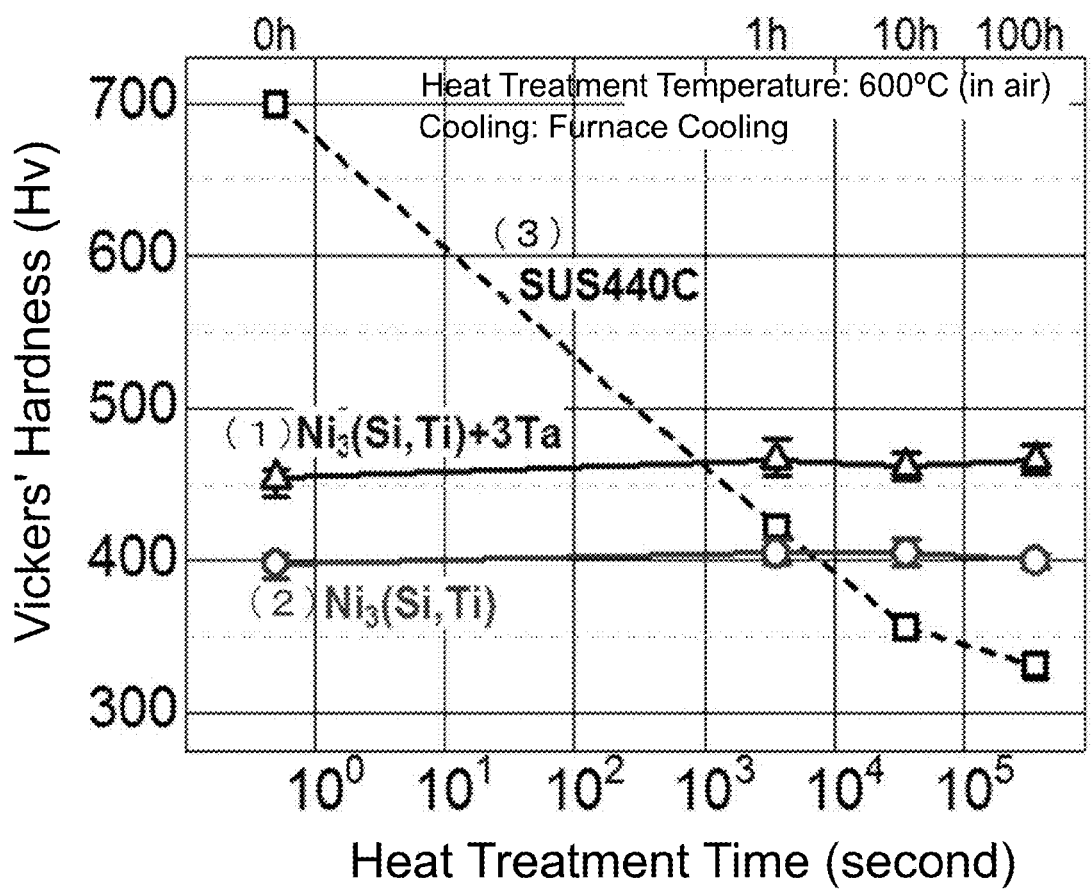
FIG. 27 is a graph showing the relationship between the time of a heat treatment and the Vickers' hardness for the $Ni_3(Si,Ti)$-based intermetallic compound alloy used in Example 1 of the present invention.

Furthermore, hardness change with the time of the heat treatment on the bearing material itself was studied to find out a factor affecting the high-temperature wear resistance of Examples 1 and 2. FIG. 27 is a graph showing the relationship between the time of the heat treatment and the Vickers' hardness for the $Ni_3(Si,Ti)$-based intermetallic compound alloy used in Example 1 of the present invention. In FIG. 27, the sample was heat-treated in the air at 600° C., furnace-cooled, and then measured for the Vickers' hardness at room temperature. (1) represents the alloy of Example 1 ($Ni_3(Si,Ti)$-based intermetallic compound alloy to which 3 at. % of Ta was added), (2) represents NST (basic composition material of the $Ni_3(Si,Ti)$-based intermetallic compound alloy), and (3) represents the alloy of Comparative Example (SUS440C).

FIG. 27 indicates that the alloy of Comparative Example (SUS440C) was reduced in hardness with the time of the heat treatment, whereas the alloy of Example 1 maintained a substantially constant hardness even when the heat treatment was prolonged. Since the NST (basic composition material of the $Ni_3(Si,Ti)$-based intermetallic compound alloy) shows similar properties, it is inferred that the alloy of Example 2 also shows similar properties. As a result, it is inferred that the materials of Examples 1 and 2 show stable hardness even at high temperature, and therefore operate steadily at high temperature.

The above-described results have demonstrated that the bearings of Examples 1 and 2 have a life of 1000 hours or longer at a temperature as high as 500° C., and therefore are practical as heat-resistant bearings. As described above, the bearing formed of the Ta or Al-added $Ni_3(Si,Ti)$-based intermetallic compound alloy operates steadily at high temperature. It is therefore possible to achieve an apparatus (for example, thermal treatment equipment with the use of the bearing of Example 1) that does not require cooling under a high-temperature environment where a conventional apparatus cannot be used without cooling, for example. In addition, it is not necessary to design the apparatus so that the bearing therein is isolated from a high-temperature environment. Accordingly, in the case of thermal treatment equipment, for example, energy saving, performance improvement (in-furnace temperature accuracy improvement) and space saving of a furnace can be achieved.

Since the $Ni_3(Si,Ti)$-based intermetallic compound alloy has nonmagnetic characteristics, a bearing formed of the intermetallic compound alloy is not likely to generate deposit of wear debris in the bearing ring due to magnetization. As a result, the bearing has a characteristic of controlling acceleration of wear. In addition, this bearing can be used suitably even in an application requiring the bearing to be nonmagnetic (for example, semiconductor production equipment).

EXPLANATION OF REFERENCE NUMERALS

1 Rolling bearing (ball bearing)
1A Slide bearing
2 Inner ring
2A, 3A Raceway surface
2B Sliding surface
3 Outer ring
4 Rolling element
5 Cage

The invention claimed is:

1. A heat-resistant rolling bearing, comprising an inner ring, an outer ring and rolling elements that roll between the inner ring and the outer ring, wherein the rolling elements are formed of a ceramic material, and at least one of the inner ring and the outer ring is formed of the $Ni_3(Si,Ti)$-based intermetallic compound alloy,
wherein the $Ni_3(Si,Ti)$-based intermetallic compound alloy comprises 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities, the $Ni_3(Si,Ti)$-based intermetallic compound alloy having a microstructure composed of an $L1_2$ phase and of one or both of an Ni solid solution phase and a second phase dispersion containing Ni and Ta, or a microstructure composed of an $L1_2$ phase.

2. The heat-resistant rolling bearing according to claim 1, wherein the $Ni_3(Si,Ti)$-based intermetallic compound alloy comprises 25 to 500 ppm by weight of B with respect to a weight of an intermetallic compound having a composition of 100% by atom in total consisting of 10.0 to 12.0% by atom of Si, 4.5 to 6.5% by atom of Ti, 3.0 to 5.0% by atom of Ta and a balance made up of Ni excepting impurities, and the $Ni_3(Si,Ti)$-based intermetallic compound alloy has a microstructure composed of an Ni solid solution phase and an $L1_2$ phase or a microstructure composed of an $L1_2$ phase.

3. The heat-resistant rolling bearing according to claim 1, wherein the $Ni_3(Si,Ti)$-based intermetallic compound alloy has a single-phase microstructure composed of an $L1_2$ phase.

4. The heat-resistant rolling bearing according to claim 1, wherein the $Ni_3(Si,Ti)$-based intermetallic compound alloy comprises 25 to 500 ppm by weight of B with respect to a weight of an intermetallic compound having a composition of 100% by atom in total consisting of 19.0 to 21.5% by atom in total of Si, Ti and Ta, and a balance made up of Ni excepting impurities.

5. The heat-resistant rolling bearing according to claim 1, wherein the rolling elements are formed of silicon nitride.

6. A method for producing a heat-resistant rolling bearing of claim 1 comprising the steps of:
preparing an ingot comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities;
giving a heat treatment to the ingot at 950 to 1100° C.;
and forming the bearing with the ingot given the heat treatment.

7. A method for producing the heat-resistant rolling bearing of claim 1 comprising the steps of:
preparing an ingot comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities;
forming the bearing with the ingot; and
giving a heat treatment to the bearing at 950 to 1100° C.

8. A heat-resistant rolling bearing comprising an inner ring, an outer ring and rolling elements between the rings, further comprising raceway surfaces on the inner ring and the outer ring in contact with the rolling elements,
wherein the raceway surfaces comprise an $Ni_3(Si,Ti)$-based intermetallic compound alloy, the $Ni_3(Si,Ti)$-based intermetallic compound alloy comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities, the $Ni_3(Si,Ti)$-based intermetallic compound alloy having a microstructure composed of an $L1_2$ phase and of one or both of an Ni solid solution phase and a second phase dispersion containing Ni and Ta, or a microstructure composed of an $L1_2$ phase.

9. The heat-resistant rolling bearing according to claim 8, wherein the $Ni_3(Si,Ti)$-based intermetallic compound alloy comprising 25 to 500 ppm by weight of B with respect to a weight of an intermetallic compound having a composition of 100% by atom in total consisting of 10.0 to 12.0% by atom of Si, 4.5 to 6.5% by atom of Ti, 3.0 to 5.0% by atom of Ta and a balance made up of Ni excepting impurities, and the $Ni_3(Si,Ti)$-based intermetallic compound alloy has a microstructure composed of an Ni solid solution phase and an $L1_2$ phase or a microstructure composed of an $L1_2$ phase.

10. The heat-resistant rolling bearing according to claim 8, wherein the $Ni_3(Si,Ti)$-based intermetallic compound alloy has a single-phase microstructure composed of an $L1_2$ phase.

11. The heat-resistant rolling bearing according to claim 8, wherein the $Ni_3(Si,Ti)$-based intermetallic compound alloy comprises 25 to 500 ppm by weight of B with respect to a weight of an intermetallic compound having a composition of 100% by atom in total consisting of 19.0 to 21.5% by atom in total of Si, Ti and Ta, and a balance made up of Ni excepting impurities.

12. A method for producing the heat-resistant rolling bearing of claim 8 comprising the steps of:
preparing an ingot comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities;
giving a heat treatment to the ingot at 950 to 1100° C.;
and forming the bearing with the ingot given the heat treatment.

13. A method for producing the heat-resistant rolling bearing of claim 8 comprising the steps of:
preparing an ingot comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities;
forming the bearing with the ingot; and
giving a heat treatment to the bearing at 950 to 1100° C.

14. A heat-resistant slide bearing comprising an internal circumferential surface,
wherein the inner circumferential surface comprises an $Ni_3(Si,Ti)$-based intermetallic compound alloy, the $Ni_3(Si,Ti)$-based intermetallic compound alloy comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities, the $Ni_3(Si,Ti)$-based intermetallic compound alloy having a microstructure composed of an $L1_2$ phase and of one or both of an Ni solid solution phase and a second phase dispersion containing Ni and Ta, or a microstructure composed of an $L1_2$ phase.

15. The heat-resistant slide bearing according to claim 14, wherein the $Ni_3(Si,Ti)$-based intermetallic compound alloy comprises 25 to 500 ppm by weight of B with respect to a weight of an intermetallic compound having a composition of 100% by atom in total consisting of 10.0 to 12.0% by atom of Si, 4.5 to 6.5% by atom of Ti, 3.0 to 5.0% by atom of Ta and a balance made up of Ni excepting impurities, and the $Ni_3(Si,Ti)$-based intermetallic compound alloy has a microstructure composed of an Ni solid solution phase and an $L1_2$ phase or a microstructure composed of an $L1_2$ phase.

16. The heat-resistant slide bearing according to claim 14, wherein the $Ni_3(Si,Ti)$-based intermetallic compound alloy has a single-phase microstructure composed of an $L1_2$ phase.

17. The heat-resistant slide bearing according to claim 14, wherein the $Ni_3(Si,Ti)$-based intermetallic compound alloy comprises 25 to 500 ppm by weight of B with respect to a weight of an intermetallic compound having a composition of 100% by atom in total consisting of 19.0 to 21.5% by atom in total of Si, Ti and Ta, and a balance made up of Ni excepting impurities.

18. A method for producing the heat-resistant slide bearing of claim 14 comprising the steps of:
preparing an ingot comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities;
giving a heat treatment to the ingot at 950 to 1100° C.; and forming the bearing with the ingot given the heat treatment.

19. A method for producing the heat-resistant slide bearing of claim 14 comprising the steps of:
preparing an ingot comprising 25 to 500 ppm by weight of B with respect to a weight of an intermetallic compound having a composition of 100% by atom in total consisting of 10.0 to 12.0% by atom of Si, 1.5% by atom or more but less than 7.5% by atom of Ti, more than 2.0% by atom but 8.0% by atom or less of Ta and a balance made up of Ni excepting impurities;
forming the bearing with the ingot; and
giving a heat treatment to the bearing at 950 to 1100° C.

\* \* \* \* \*